(12) United States Patent
Chen et al.

(10) Patent No.: US 11,291,979 B2
(45) Date of Patent: Apr. 5, 2022

(54) β-ZEOLITE AND PRODUCTION METHOD THEREOF

(71) Applicant: TOSOH CORPORATION, Yamaguchi (JP)

(72) Inventors: Ning Chen, Yamaguchi (JP); Yusuke Naraki, Yamaguchi (JP)

(73) Assignee: TOSOH CORPORATION, Yamaguchi (JP)

( * ) Notice: Subject to any disclaimer, the term of this patent is extended or adjusted under 35 U.S.C. 154(b) by 0 days.

(21) Appl. No.: 16/771,483

(22) PCT Filed: Dec. 12, 2018

(86) PCT No.: PCT/JP2018/045617
§ 371 (c)(1),
(2) Date: Jun. 10, 2020

(87) PCT Pub. No.: WO2019/117183
PCT Pub. Date: Jun. 20, 2019

(65) Prior Publication Data
US 2021/0069686 A1 Mar. 11, 2021

(30) Foreign Application Priority Data
Dec. 14, 2017 (JP) .............................. JP2017-239174

(51) Int. Cl.
*C01B 39/48* (2006.01)
*B01J 37/00* (2006.01)
(Continued)

(52) U.S. Cl.
CPC ...... *B01J 29/7615* (2013.01); *B01D 53/9418* (2013.01); *B01J 37/0018* (2013.01);
(Continued)

(58) Field of Classification Search
CPC ............ B01D 53/9413; B01D 53/9418; B01D 53/9422; B01D 2255/20738;
(Continued)

(56) References Cited

U.S. PATENT DOCUMENTS 4,961,917 A    10/1990   Byrne et al.
5,164,169 A * 11/1992   Rubin .................. B01J 29/7007
                                                    423/709
(Continued)

FOREIGN PATENT DOCUMENTS

EP    0 915 056 A1    5/1999
EP    2 067 746 A1    6/2009
(Continued)

OTHER PUBLICATIONS

International Search Report issued in International Patent Application No. PCT/JP2018/045617 dated Jan. 15, 2019, and English Translation thereof.
(Continued)

Primary Examiner — Timothy C Vanoy
(74) Attorney, Agent, or Firm — Greenblum & Bernstein, P.L.C.

(57) ABSTRACT

Provided is a β-zeolite that has an $SiO_2/Al_2O_3$ ratio of less than 20 but yet is comparable or superior in heat resistance to conventional β-zeolites having $SiO_2/Al_2O_3$ ratio of 20 or greater. This β-zeolite is characterized in that: in powder X-ray diffractometry using a CuKα-ray as a ray source, the full width at half maximum of a powder X-ray diffraction peak on the (302) plane is 0.15-0.50 inclusive; and the molar ratio of silica to alumina is less than 20.0. Preferably, the β-zeolite is obtained by a production method which comprises a crystallization step for crystallizing a composition comprising an alumina source, a silica source, an alkali source, a tetraethylammonium cation source and water,
(Continued)

characterized in that the composition contains potassium and the molar ratio of potassium to silica exceeds 0.04.

10 Claims, 6 Drawing Sheets

(51) Int. Cl.
  *B01J 29/76* (2006.01)
  *B01D 53/94* (2006.01)
(52) U.S. Cl.
  CPC ...... *C01B 39/48* (2013.01); *B01D 2255/2022* (2013.01); *B01D 2255/2027* (2013.01); *B01D 2255/20738* (2013.01); *B01D 2255/20761* (2013.01); *B01D 2255/502* (2013.01); *C01P 2002/72* (2013.01); *C01P 2002/74* (2013.01); *C01P 2004/03* (2013.01)
(58) Field of Classification Search
  CPC .... B01D 2255/20761; B01D 2255/502; B01D 2257/402; B01D 2257/404; B01D 2258/012; B01J 29/072; B01J 29/7007; B01J 29/7215; B01J 29/7615; B01J 35/002; B01J 37/031; B01J 37/00; F01N 3/2066; F01N 2370/04; F01N 2570/14; C01P 2002/74; C01P 2004/03
  See application file for complete search history.

(56) References Cited

U.S. PATENT DOCUMENTS

| | | | | |
|---|---|---|---|---|
| 5,171,556 A | * | 12/1992 | Caullet | B01J 29/7007 423/705 |
| 6,914,026 B2 | * | 7/2005 | Tran | B01D 53/8628 502/66 |
| 7,501,105 B2 | * | 3/2009 | Nagata | B01J 29/7615 423/213.2 |
| 2001/0008624 A1 | | 7/2001 | Takahashi et al. | |
| 2010/0003178 A1 | * | 1/2010 | Tokunaga | B01J 29/7007 423/239.2 |
| 2010/0322847 A1 | | 12/2010 | Xiao et al. | |
| 2012/0141370 A1 | | 6/2012 | Tokunaga | |
| 2012/0190534 A1 | * | 7/2012 | Itabashi | B01D 53/945 502/60 |
| 2012/0207669 A1 | | 8/2012 | Naraki et al. | |
| 2013/0202524 A1 | * | 8/2013 | Maurer | B01D 53/8628 423/709 |

FOREIGN PATENT DOCUMENTS

| | | | | |
|---|---|---|---|---|
| EP | 2 471 597 A1 | | 7/2012 | |
| EP | 2 518 017 A1 | | 10/2012 | |
| EP | 3 708 252 A1 | * | 9/2020 | ......... B01J 29/7615 |
| WO | 2013/035077 | | 3/2013 | |

OTHER PUBLICATIONS

Written Opinion of the International Search Authority in International Patent Application No. PCT/JP2018/045617 dated Jan. 15, 2019, and English Translation thereof.
International Preliminary Report on Patentability Chapter I in International Patent Application No. PCT/JP2018/045617 dated Jun. 16, 2020, and English Translation thereof.
Extended European Search Report issued in European Patent Application No. 18889743.3 dated Aug. 4, 2021.

* cited by examiner

β-ZEOLITE AND PRODUCTION METHOD THEREOF

TECHNICAL FIELD

The present disclosure relates to a β-zeolite suitable as a catalyst for reducing nitrogen oxides and a production method thereof.

BACKGROUND ART

The catalyst for reducing nitrogen oxides is a catalyst used in an atmosphere exposed to a water-containing atmosphere at high temperature, such as an exhaust catalyst of an internal combustion engine. From the viewpoints of performance and cost, a β-zeolite incorporating a metal, mainly iron, has been studied as the catalyst for reducing nitrogen oxides (Patent Literature 1). However, the catalyst for reducing nitrogen oxides using a β-zeolite has nitrogen oxide reduction characteristics which degrade significantly, particularly in a low temperature range, when exposed to a water-containing atmosphere at high temperature. As one of the causes of the characteristics degradation, it is presumed that the β-zeolite has a low heat resistance, that is, when exposed to a water-containing atmosphere at high temperature, aluminum is detached from a crystal structure and the crystal structure collapses.

Various studies have been made to improve the heat resistance of β-zeolite so far. For example, in Patent Literature 2, it is disclosed that in regard to a β-zeolite having a molar ratio of silica to alumina (hereinafter also referred to as "$SiO_2/Al_2O_3$ ratio") of 80 or more, the heat resistance of the β-zeolite increases with increase in the average particle size of the primary particles to 30 nm (0.03 μm) or more.

However, with increase in the $SiO_2/Al_2O_3$ ratio of a β-zeolite, the nitrogen oxide reduction characteristics of the β-zeolite incorporating a metal tend to decrease. Due to the too high $SiO_2/Al_2O_3$ ratio, the β-zeolite having an $SiO_2/Al_2O_3$ ratio of 80 or more is not suitable as a catalyst for reducing nitrogen oxides.

On the other hand, it is disclosed that the heat resistance of a β-zeolite having an $SiO_2/Al_2O_3$ ratio of less than 80 is greatly affected by the $SiO_2/Al_2O_3$ ratio as compared to by the particle size and the crystal structure in Patent Literature 2. Furthermore, it is disclosed that the heat resistance of a β-zeolite having an $SiO_2/Al_2O_3$ ratio of less than 80 has a low heat resistance in Patent Literature 2. As described above, it is known that due to the low $SiO_2/Al_2O_3$ ratio, a β-zeolite having an $SiO_2/Al_2O_3$ ratio of less than 80 has no improved heat resistance even with control of the particle size and crystal structure.

In contrast, in Patent Literature 3, it is disclosed that the heat resistance of a β-zeolite having an $SiO_2/Al_2O_3$ ratio of even less than 80 can be increased by controlling the SEM diameter, the full width at half maximum of the (302) plane in X-ray crystal diffraction, and the $NH_3$ adsorption amount. In Patent Literature 3, it is disclosed that the heat resistance is increased by controlling the SEM diameter and the like of a β-zeolite having an $SiO_2/Al_2O_3$ ratio of 20 to 40, and further, such a β-zeolite incorporating iron makes a catalyst for reducing nitrogen oxides having high nitrogen oxide reduction characteristics in a low temperature range even after exposure to a water-containing atmosphere at high temperature.

Incidentally, along with strengthening of environmental regulations, further improvement in the nitrogen oxide reduction characteristics of a catalyst for reducing nitrogen oxides is required. Improvement in the nitrogen oxide reduction characteristics in a low temperature range of a catalyst for reducing nitrogen oxides is particularly required. For further improvement in the nitrogen oxide reduction characteristics in a low temperature range, it is conceivable to further reduce the $SiO_2/Al_2O_3$ ratio without decrease in the heat resistance.

As a β-zeolite having a lower $SiO_2/Al_2O_3$ ratio than the β-zeolite in Patent Literature 3, a β-zeolite having an $SiO_2/Al_2O_3$ ratio of 13.6 or less (Patent Literature 4) and a β-zeolite having an $SiO_2/Al_2O_3$ ratio of 11 to 12 (Patent Literature 5 and 6) are disclosed. Any of these β-zeolites is a β-zeolite obtained by a production method for crystallizing a raw material containing no organic structure directing agent. In Patent Literature 5, the $SiO_2/Al_2O_3$ ratio of the β-zeolite is said to be 2 to 200. However, no β-zeolite having an $SiO_2/Al_2O_3$ ratio of more than 13.6 obtained by a method for crystallizing a raw material containing no organic structure directing agent has been actually reported.

CITATION LIST

Patent Literature

Patent Literature 1: U.S. Pat. No. 4,961,917
Patent Literature 2: U.S. Patent Publication No. 2001/008624
Patent Literature 3: U.S. Patent Publication No. 2010/003178
Patent Literature 4: U.S. Patent Publication No. 2012/0190534
Patent Literature 5: International Publication No. WO 2013/035077
Patent Literature 6: U.S. Patent Publication No. 2010/0322847

SUMMARY OF INVENTION

Technical Problem

While a β-zeolite can be expected to have improved nitrogen oxide reduction characteristics in a low temperature range with decrease in the $SiO_2/Al_2O_3$ ratio, the heat resistance tends to decrease. The β-zeolites disclosed in Patent Literature 4 to 6 are no exception, so that the heat resistance remarkably decreases with the decrease in the $SiO_2/Al_2O_3$ ratio. Therefore, compared with the effect of improvement in nitrogen oxide reduction characteristics due to decrease in the $SiO_2/Al_2O_3$ ratio, the influence of decrease in the nitrogen oxide reduction characteristics due to the decrease in the heat resistance is greater.

As described above, a β-zeolite having a lower $SiO_2/Al_2O_3$ ratio than a β-zeolite having an $SiO_2/Al_2O_3$ ratio of 20 or more has a heat resistance which significantly decreases with decrease in the $SiO_2/Al_2O_3$ ratio. A β-zeolite having an $SiO_2/Al_2O_3$ ratio of less than 20 and a sufficient heat resistance for use as a catalyst for reducing nitrogen oxides is therefore unprecedented.

In view of these problems, an object of the present disclosure is to provide a β-zeolite having a heat resistance equal to or higher than that of a conventional β-zeolite having an $SiO_2/Al_2O_3$ ratio of 20 or more, while having an $SiO_2/Al_2O_3$ ratio of less than 20. Further, another object of the present disclosure is to provide a zeolite which contains such a β-zeolite, with decrease in nitrogen oxide reduction characteristics in the low temperature range being suppressed even after exposure to a water-containing atmosphere at high temperature.

Solution to Problems

In the present disclosure, a β-zeolite suitable for a catalyst for reducing nitrogen oxides and a base material thereof have been studied. As a result, it has been found that the heat resistance of a β-zeolite having an $SiO_2/Al_2O_3$ ratio of less than 20 cannot be sufficiently improved by simply applying a method for improving the heat resistance of β-zeolite having an $SiO_2/Al_2O_3$ ratio of 20 or more disclosed in Patent Literature 3 and the like. In addition to that, it has been found that a β-zeolite having an $SiO_2/Al_2O_3$ ratio of less than 20 made to have a specified crystal structure has a high heat resistance. Furthermore, it has been found that such a β-zeolite provides a catalyst for reducing nitrogen oxides having high nitrogen oxide reduction characteristics in a low temperature range, even with a small amount of impurities contained.

That is, the summary of the present disclosure is as follows.

[1] A β-zeolite, characterized by having a full width at half maximum of the powder X-ray diffraction peak of the (302) plane of 0.15 or more and 0.50 or less in powder X-ray diffraction measurement with a CuKα ray as radiation source, and a molar ratio of silica to alumina of less than 20.0.

[2] The β-zeolite according to the above [1], having a β-type structure content of 86% or more.

[3] The β-zeolite according to the above [1] or [2], having a fluorine content of 100 ppm by weight or less.

[4] The β-zeolite according to any one of the above [1] to [3], having at least powder X-ray diffraction peaks below in powder X-ray diffraction measurement with a CuKα ray as radiation source.

TABLE 1

| 2 θ | Relative intensity* |
|---|---|
| 21.28°~21.40° | 10 or more and 20 or less |
| 22.33°~22.46° | 100 |
| 25.22°~25.36° | 10 or more and 20 or less |
| 27.00°~27.12° | 10 or more and 25 or less |
| 29.42°~29.66° | 10 or more and 25 or less |

*Relative intensity is an intensity relative to peak intensity at 2θ = 22.33 to 22.46°.

[5] The β-zeolite according to any one of the above [1] to [4], containing at least one of iron and copper.

[6] A method for producing the β-zeolite according to any one of the above [1] to [5], comprising a crystallization step of crystallizing a composition containing an alumina source, a silica source, an alkali source, a tetraethylammonium cation source and water, wherein the composition contains potassium, and a molar ratio of potassium to silica is more than 0.04.

[7] The production method according to the above [6], wherein the alkali source is a potassium source.

[8] The production method according to the above [6] or [7], wherein the composition has the molar composition below:

$SiO_2/Al_2O_3$ ratio=10.0 or more and 50.0 or less
$TEA/SiO_2$ ratio=0.03 or more and 0.30 or less
$K/SiO_2$ ratio=more than 0.04 and less than 0.70
$Na/SiO_2$ ratio=0 or more and less than 0.10
$H_2O/SiO_2$ ratio=5.0 or more and 50.0 or less
$OH/SiO_2$ ratio=0.10 or more and 1.00 or less
Seed crystal=0 wt % or more and 10 wt % or less.

[9] A catalyst comprising the β-zeolite according to any one of the above [1] to [5].

[10] A method for reducing nitrogen oxides, comprising the step of contacting the β-zeolite according to any one of the above [1] to [5] with a nitrogen oxide-containing gas.

Advantageous Effects of Invention

According to the present disclosure, while having an $SiO_2/Al_2O_3$ ratio of less than 20, a β-zeolite having a heat resistance equal to or higher than that of a conventional β-zeolite having an $SiO_2/Al_2O_3$ ratio of 20 or more can be provided. Further, a zeolite which contains the zeolite described above, with decrease in nitrogen oxide reduction characteristics in the low temperature range being suppressed even after exposure to a water-containing atmosphere at high temperature, can be provided.

DESCRIPTION OF EMBODIMENTS

Preferred embodiments of a β-zeolite of the present disclosure are described as follows.

The present embodiment relates to a β-zeolite. The β-zeolite has a crystal structure to make a BEA* structure, i.e., a structure code defined by the International Zeolite Society (hereinafter also simply referred to as "β-type structure"). The β-type structure can be identified by comparing the powder X-ray diffraction (hereinafter referred to as "XRD") pattern with the XRD patterns in U.S. Pat. No. 3,308,069.

Preferably, the XRD measurement conditions in the present disclosure are the following conditions.

Radiation source: CuKα ray (λ=1.5405 Angstrom)
Measurement mode: step scan
Scan condition: 40°/min
Measurement time: 3 seconds In the XRD measurement with a CuKα ray as radiation source, the β-zeolite in the present embodiment has a full width at half maximum of the XRD peak of the (302) plane of 0.15 or more and 0.50 or less, preferably 0.15 or more and 0.40 or less, more preferably 0.20 or more and 0.50 or less, still more preferably 0.23 or more and 0.40 or less, particularly preferably 0.25 or more and 0.35 or less. Due to a crystal structure having such a full width at half maximum (hereinafter also referred to as "FWHM"), the β-zeolite in the present embodiment has a high heat resistance even though having an $SiO_2/Al_2O_3$ ratio of less than 20. The heat resistance of a β-zeolite tends to decrease with decrease in the $SiO_2/Al_2O_3$ ratio. Nevertheless, the β-zeolite in the present embodiment exhibits a heat resistance equal to or more than that of a β-zeolite having an $SiO_2/Al_2O_3$ ratio of 20 or more.

In the XRD measurement with a CuKα ray as radiation source, the XRD peak of the (302) plane (hereinafter also referred to as "$Peak_{(302)}$") is an XRD peak having a peak top at 2θ of 22.33° or more and 22.46° or less, preferably an XRD peak having a peak top at 2θ of 22.34° or more and 22.44° or less. The FWHM of $Peak_{(302)}$ can be used as an index of the crystallinity of a β-zeolite.

By exposure to a water-containing atmosphere at high temperature, a β-zeolite undergoes disintegration of the crystal structure, so that the FWHM of $Peak_{(302)}$ tends to increase.

Preferably, the above-mentioned FWHM is an FWHM before exposure to a water-containing atmosphere at high temperature, and the β-zeolite in the present embodiment has a small FWHM even after exposure to a water-containing atmosphere at high temperature. After a hydrothermal aging treatment under the following conditions, the β-zeolite in the present embodiment has an FWHM (hereinafter also referred to as "FWHM$_{aged}$") of Peak$_{(302)}$ of 0.55 or less, preferably 0.45 or less, more preferably 0.40 or less. Since the FWHM tends to increase by the hydrothermal aging treatment, the lower limit value of FWHM$_{aged}$ is more than 0.15, preferably 0.20 or more, more preferably 0.25 or more.

Treatment atmosphere: 10 vol % H$_2$O-containing air
Treatment temperature: 700° C.
Treatment time: 20 hours
Circulation rate: 300 mL/min The β-zeolite in the present embodiment is preferably a synthetic zeolite, more preferably a β-zeolite obtained by crystallization of a composition containing an organic structure directing agent, still more preferably a β-zeolite obtained by crystallization of a composition containing an organic structure directing agent in a calcined state. Examples of the calcination after crystallization include calcination in air at 600° C. for 2 hours.

The β-zeolite in the present embodiment has a change ratio of the FWHM of Peak$_{(302)}$ by calcination after crystallization (hereinafter also referred to as "FWHM change ratio") determined from the following equation of 1.15 or more and 2.00 or less, or 1.20 or more and 1.60 or less.

FWHM change ratio=FWHM of Peak$_{(302)}$ of β-zeolite after calcination/FWHM of Peak$_{(302)}$ of β-zeolite after crystallization In the XRD measurement with a CuKα ray as radiation source, the β-zeolite in the present embodiment has at least XRD peaks shown in the following table.

TABLE 2

| | Relative intensity* | |
|---|---|---|
| 2 θ | Preferred range | More preferred range |
| 21.28°~21.40° | 10 or more and 20 or less | 10 or more and 15 or less |
| 22.33°~22.46° | 100 | 100 |
| 25.22°~25.36° | 10 or more and 20 or less | 10 or more and 16 or less |
| 27.00°~27.12° | 10 or more and 25 or less | 12 or more and 22 or less |
| 29.42°~29.66° | 10 or more and 25 or less | 12 or more and 20 or less |

*Relative intensity is an intensity relative to peak intensity at 2θ = 22.33 to 22.46°.

More preferably, in the XRD measurement with a CuKα ray as radiation source, the β-zeolite in the present embodiment has at least XRD peaks shown in the following table.

TABLE 3

| | Relative intensity* | |
|---|---|---|
| 2 θ | Preferred range | More preferred range |
| 13.36°~13.48° | 5 or more and 15 or less | 5 or more and 10 or less |
| 21.28°~21.40° | 10 or more and 20 or less | 10 or more and 15 or less |
| 22.33°~22.46° | 100 | 100 |
| 25.22°~25.36° | 10 or more and 20 or less | 10 or more and 16 or less |
| 27.00°~27.12° | 10 or more and 25 or less | 12 or more and 22 or less |

TABLE 3-continued

| | Relative intensity* | |
|---|---|---|
| 2 θ | Preferred range | More preferred range |
| 28.50°~28.68° | 5 or more and 20 or less | 5 or more and 17 or less |
| 29.42°~29.66° | 10 or more and 25 or less | 12 or more and 20 or less |

*Relative intensity is an intensity relative to peak intensity at 2θ = 22.33 to 22.46°.

The XRD pattern of the β-zeolite in the present embodiment may include another XRD peaks derived from the β-type structure in addition to the XRD peaks described above.

Preferably, the β-zeolite in the present embodiment is made of a single phase of β-zeolite only. However, the β-zeolite in the present embodiment may contain a zeolite having a structure other than the β-type structure (hereinafter also referred to as "by-product zeolite") to an extent not to cause decrease in the heat resistance. Examples of the by-product zeolite include at least one of a GIS-type zeolite and an MFI-type zeolite, and further, a GIS-type zeolite. Examples of the β-zeolite in the present embodiment include a zeolite composition comprising a β-zeolite and a GIS-type zeolite, and a single phase of a β-zeolite.

In the case of a β-zeolite containing a by-product zeolite, the β-zeolite in the present embodiment may be regarded as a zeolite composition comprising a β-zeolite and a by-product zeolite.

The by-product zeolite content can be determined from the following equation using an XRD pattern obtained in the XRD diffraction measurement with a CuKα ray as radiation source:

By-product zeolite content (%)=$I_{by\text{-}pro}/(I_{(302)}+I_{by\text{-}pro})\times 100$  (1)

In the above equation, $I_{(302)}$ is the intensity of Peak$_{(302)}$, and $I_{by\text{-}pro}$ is the intensity of the main peak of a by-product zeolite. $I_{by\text{-}pro}$ is the intensity of an XRD peak which characterizes the structure of a by-product zeolite, such as an XRD peak known to those skilled in the art. For example, in the case where the by-product zeolite is a GIS-type zeolite, $I_{by\text{-}pro}$ is the intensity of the XRD peak having a peak top at 2θ=28.20±0.1°. In the case where the by-product zeolite is an MFI-type zeolite, $I_{by\text{-}pro}$ is the intensity of the XRD peak having a peak top at 2θ=23.22±0.1°.

Also, the β-type structure content is the percentage of the β-type structure in the β-zeolite in the present embodiment, i.e., the purity of the β-zeolite, which can be determined from the following equation.

β-type structure content (%)=100−by-product zeolite content (%)

Preferably, the β-type structure content in the β-zeolite in the present embodiment is 86% or more (by-product zeolite content: 14% or less), more preferably 90% or more (by-product zeolite content: 10% or less), still more preferably 95% or more (by-product zeolite content: 5% or less). In the present embodiment, it may be determined that the β-type structure content is 100% (by-product zeolite content: 0%), in other words, the β-type structure is a single phase of the β-zeolite, by $I_{by\text{-}pro}$ lower than the detection limit in the XRD measurement or from the equation (1).

Preferably, values determined from the XRD measurement with a CuKα ray as radiation source, such as Peak$_{(302)}$, $I_{(302)}$, $I_{by\text{-}pro}$, FWHM and XRD peaks, are the values of a β-zeolite in a state containing no organic structure directing agent. These values may be values obtained by analyzing an XRD pattern measured with a standard powder X-ray diffraction apparatus (e.g., apparatus name: Ultima IV, manufactured by Rigaku Corporation) using a software attached to the apparatus.

Preferably, the ratio of the maximum intensity of absorption peaks in the range of 3580 $cm^{-1}$ or more and 3610 $cm^{-1}$ or less (hereinafter referred to as "P2") to the maximum intensity of absorption peaks in the range of 3720 $cm^{-1}$ or more and 3750 $cm^{-1}$ or less (hereinafter also referred to as "P1") of the IR spectrum, (hereinafter also referred to as "P2/P1 ratio"), is 0.08 or more, preferably 0.08 or more and 1.00 or less, more preferably 0.10 or more and 0.50 or less.

Preferably, P1 or P2 respectively is an absorption peak in any one of the following ranges.

P1: 3720 $cm^{-1}$ or more and 3750 $cm^{-1}$ or less, preferably 3730 $cm^{-1}$ or more and 3740 $cm^{-1}$ or less P2: 3580 $cm^{-1}$ or more and 3610 $cm^{-1}$ or less, preferably 3590 $cm^{-1}$ or more and 3600 $cm^{-1}$ or less The measurement conditions of the IR spectrum in the present embodiment may be arbitrarily determined. The measurement by a heat transmission method under the following conditions is preferred.

Measurement method: heat permeation method

Pretreatment: Temperature is retained at 500° C. for 2 hours under vacuum evacuation. Measurement is performed after the temperature is lowered to room temperature.

Measurement temperature: 500° C.

Measurement wave number range: 800 to 4000 cm-1

Resolution: 2 cm-1

Number of acquisitions: 12.8

Preferably, the zeolite in the present embodiment is a crystalline aluminosilicate. The crystalline aluminosilicate is made of a crystal having a framework consisting of a three-dimensional network structure having aluminum (Al) and silicon (Si) as framework metals (hereinafter also referred to as "T atoms"), with the T atoms being linked through oxygen (O). Preferably, in the present embodiment, the zeolite comprises no porous inorganic substances containing other than Al and Si as T atoms, or the so-called analogues of zeolite, such as silicoaluminophosphate (SAPO) containing silicon (Si), aluminum (Al) and phosphorus (P) as T atoms, and aluminophosphates (AlPO) containing aluminum (Al) and phosphorus (P) as T atoms.

The β-zeolite in the present embodiment has a molar ratio of silica to alumina ($SiO_2/Al_2O_3$ ratio) of less than 20.0. Due to having above mentioned FWHM of $Peak_{(302)}$, the β-zeolite in the present embodiment has a high heat resistance even with an $SiO_2/Al_2O_3$ ratio of less than 20, the heat resistance exhibited being equal to that of a β-zeolite having an $SiO_2/Al_2O_3$ ratio of 20 or more, preferably more than that of a β-zeolite having an $SiO_2/Al_2O_3$ ratio of 20 or more.

Preferably, the $SiO_2/Al_2O_3$ ratio is 10.0 or more and less than 20.0, preferably more than 13.6 and 19.5 or less, more preferably 14.0 or more and 19.0 or less, still more preferably 14.5 or more and 19.0 or less.

Preferably, the β-zeolite in the present embodiment contains substantially no fluorine (F), and the fluorine content is preferably 100 ppm by weight or less, more preferably 0 ppm by weight. Since there exists a measurement limit of fluorine obtained by a conventional composition analysis method, the fluorine content in the β-zeolite in the present embodiment is preferably the measurement limit or less, preferably 0 ppm by weight or more and 100 ppm by weight or less, more preferably 0 ppm by weight or more and 50 ppm by weight or less.

Preferably, the cation type of the β-zeolite in the present embodiment is any one of a proton type ($H^+$ type) and an ammonia type ($NH_4$ type), and a proton type is preferred.

In the present embodiment, crystals (primary crystals) constituting crystal particles of the β-zeolite can be observed through a field emission type electron microscope. A crystal with high crystallinity is identified as a shape having ridges and planes. On the other hand, a crystal with low crystallinity has no ridges and planes, and is sometimes identified as a shape with mainly curved surfaces, or is sometimes not observed by a field emission type electron microscope due to smallness of the crystal (primary crystal). The β-zeolite crystals with high crystallinity are identified as various shapes derived from crystallization, such as a double quadrangular frustum shape (FIG. 1(a)) and an approximately octahedron shape (FIG. 1(b)). For example, the double quadrangular frustrum-shaped crystal is a crystal formed with orientation in the a-axis direction and the b-axis direction, having a double quadrangular frustum bottom, while the approximately octahedron-shaped crystal is a crystal formed with orientation in the a-axis direction and the c-axis direction, having a shape with a double quadrangular frustum bottom to make the ridges and vertexes.

The crystals constituting the crystal particles of the β-zeolite in the present embodiment (primary crystals) preferably contain double quadrangular frustum-shaped crystals, more preferably consisting of double quadrangular frustum-shaped crystals. It is preferable that the a-axis length of the double quadrangular frustum-shaped crystal be longer than the c-axis length, and the ratio of the a-axis length to the c-axis length of the crystal (hereinafter also referred to as "aspect ratio") is preferably 0.1 or more and 1.3 or less, more preferably 0.3 or more and less than 1.0.

Preferably, the β-zeolite in the present embodiment comprises a crystal particle made of individual primary grains independently grown (hereinafter also referred to as "primary crystal particles"). The primary crystal particles are observed as independent crystal particles having an approximately spherical shape, a double quadrangular frustum shape, or an approximately octahedron shape.

The β-zeolite in the present embodiment is preferably composed of primary crystal particles but may contain crystal particles composed of aggregates formed from a plurality of primary grains grown through chemical bonding (hereinafter also referred to as "aggregated crystal particles"). The aggregated crystal particles may be identified as crystal particles containing a part of primary crystal particles in electron microscopic observation in some cases. The aggregated crystal particles are made of a plurality of crystals chemically bonded in an irregular manner, having a shape different from that of the primary crystal particles. In the electron microscopic observation, the aggregated crystal particles are observed as crystal particles having a composite crystal shape such as a bicrystal shape, a polyhedron shape or an formless shape, which is particularly different from a double quadrangular frustum shape. When a physical force, such as crushing force, is applied to the aggregated crystal particles, the crystals of the aggregated crystal particles are broken. Primary crystal particles cannot be taken out of the aggregated crystal particles once formed.

Crystal particles (i.e., primary crystal particles and aggregated crystal particles) may form agglomerates, i.e., so-called secondary particles, which are agglomerated by physical force such as van der Waals force in some cases. The agglomeration of agglomerates is different from chemical bonding, so that individual crystal particles constituting the agglomerates may be separated by cracking or crushing in some cases. The particles of the β-zeolite in the present embodiment may contain agglomerates.

Preferably, the β-zeolite in the present embodiment has an average particle size of primary crystal particles (hereinafter also referred to as "average crystal particle size") of 0.2 μm or more and 0.7 μm or less, more preferably 0.3 μm or more and 0.6 μm or less.

The average crystal particle size can be determined by measuring the horizontal Feret diameters of 150 or more primary crystal particles observed in electron microscope and averaging those. Preferably, the observation magnification of the electron microscope is 3000 to 15000 times.

Preferably, the β-zeolite in the present embodiment contains a metal, more preferably contains a transition metal, still more preferably contains at least one selected from iron and copper, and particularly preferably contains iron. Containing a metal, the β-zeolite in the present embodiment exhibits nitrogen oxide reduction characteristics suitable as a catalyst for reducing nitrogen oxides, functioning as a catalyst for reducing nitrogen oxides excellent in nitrogen oxide reduction characteristics in a low temperature range.

Preferably, the metal is contained as other than the T atoms, in at least one selected from the group consisting of pores, surfaces, and ion exchange sites.

Preferably, the weight ratio of metal to the total weight of the metal-containing β-zeolite and the metal in terms of oxide (hereinafter also referred to as "metal content") is 1.0 wt % or more and 5.0 wt % or less, preferably 1.5 wt % or more and 4.5 wt % or less. In the case of the metal of iron, the metal content (hereinafter also referred to as "iron content") is preferably 1.0 wt % or more and 10.0 wt % or less, more preferably 2.5 wt % or more and 7.0 wt % or less, still more preferably 2.5 wt % or more and 5.0 wt % or less.

The β-zeolite in the present embodiment can be used for known applications of zeolite, such as at least one of a catalyst and an adsorbent. Preferably, the application of the β-zeolite in the present embodiment includes at least one selected from the group consisting of a catalyst, an adsorbent, a catalyst support, and an adsorbent support, preferably at least one selected from a catalyst or a catalyst support. It is preferable that the β-zeolite be used in a method for reducing nitrogen oxides, and it is more preferable that the β-zeolite be used in a method for reducing nitrogen oxides, comprising the step of contacting the β-zeolite with a nitrogen oxide-containing gas.

Preferably, the catalyst containing the β-zeolite in the present embodiment (hereinafter also referred to as "the present catalyst") is in a form selected from a powder and a molding. In the case where the present catalyst is in a powder form, a base material such as a honeycomb may be coated or washcoated with the present catalyst to make a catalyst member. In the case where the present catalyst is a molding, the shape may be at least one selected from the group consisting of a spherical shape, an approximately spherical shape, an oval shape, a disc shape, a cylindrical shape, a polyhedron shape, a formless shape, and a petal shape, or a shape suitable for application.

Preferably, the application of the metal-containing β-zeolite in the present embodiment (hereinafter also referred to as "the present metal-containing β-zeolite") is for a catalyst for reducing nitrogen oxides, preferably a catalyst for selectively reducing nitrogen oxides, more preferably a catalyst for selectively reducing nitrogen oxides using urea as a reducing agent. The present metal-containing β-zeolite has high nitrogen oxide reduction characteristics, with only a small decrease in nitrogen oxide reduction characteristics even after exposure to high temperature and high humidity.

Preferably, the metal-containing β-zeolite has high nitrogen oxide reduction characteristics in a low temperature range and high nitrogen oxide reduction characteristics in a low temperature range after exposure to high temperature and high humidity.

Preferably, "the nitrogen oxide reduction characteristics in a low temperature" in the present embodiment is a nitrogen oxide reduction ratio at 150° C. or more and 250° C. or less, preferably a nitrogen oxide reduction ratio at 150° C. or more and 200° C. or less.

Preferably, the present metal-containing β-zeolite is used in a method for reducing nitrogen oxides, comprising the step of contacting a metal-containing β-zeolite with a nitrogen oxide-containing gas (hereinafter also referred to as "contact step").

Preferably, contact conditions in the contact step are as follows.

Space velocity: 500 to 500000 hours$^{-1}$, preferably 2000 to 300000 hours$^{-1}$ Contact temperature: 120° C. or more and 600° C. or less, preferably 150° C. or more and 550° C. or less Preferably, the nitrogen oxide-containing gas is a gas containing nitrogen oxides, preferably a gas containing at least one selected from the group consisting of nitrogen monoxide, nitrogen dioxide, dinitrogen trioxide, dinitrogen tetroxide and dinitrogen monoxide, more preferably a gas containing at least one selected from the group consisting of nitrogen monoxide, nitrogen dioxide and dinitrogen monoxide. Further, the nitrogen oxide-containing gas may contain components other than nitrogen oxides. It is preferable that the nitrogen oxide-containing gas be a gas comprising at least one selected from the group consisting of hydrocarbon, carbon monoxide, carbon dioxide, hydrogen, nitrogen, oxygen, sulfur oxide and water, and nitrogen oxides.

Preferably, the nitrogen oxide-containing gas is an exhaust gas of an internal combustion engine, preferably an exhaust gas of a diesel automobile, a gasoline automobile, a boiler, a gas turbine, etc.

Preferably, the contact between the present metal-containing β-zeolite and the nitrogen oxide-containing gas in the contact step in the present embodiment is performed in the presence of a reducing agent, preferably in the presence of at least one selected from the group consisting of ammonia, urea, organic amine, hydrocarbon, alcohol, ketone, carbon monoxide and hydrogen, more preferably in the presence of at least one selected from the group consisting of ammonia, urea and organic amine.

Subsequently, a method for producing the β-zeolite in the present embodiment is described as follows.

The β-zeolite in the present embodiment can be produced by a step including a crystallization step of crystallizing a composition containing an alumina source, a silica source, an alkali source, a tetraethylammonium cation source and water. The β-zeolite obtained by crystallizing a composition containing a tetraethylammonium cation source and the β-zeolite obtained by crystallizing a composition containing no tetraethylammonium cation source tend to have difference in the crystal orientation and the shape.

Preferably, the method for producing a β-zeolite in the present embodiment comprises a crystallization step of crystallizing a composition containing an alumina source, a silica source, a potassium source, a tetraethylammonium cation source and water (hereinafter also referred to as "raw material composition"), the composition having a molar ratio of potassium to silica of more than 0.04.

Preferably, the alumina source is alumina ($Al_2O_3$) or an aluminum compound to make a precursor thereof, and examples thereof include at least one selected from the group consisting of alumina, aluminum sulfate, aluminum nitrate, sodium aluminate, aluminum hydroxide, aluminum chloride, an amorphous aluminosilicate, metallic aluminum and an aluminum alkoxide.

Preferably, the silica source is silica ($SiO_2$) or a silicon compound to make a precursor thereof, and examples thereof include at least one selected from the group consisting of colloidal silica, amorphous silica, sodium silicate, tetraethoxysilane, tetraethyl orthosilicate, precipitated silica, fumed silica and amorphous aluminosilicate.

Amorphous aluminosilicate is a compound which functions as an alumina source and a silica source (hereinafter also referred to as "silica-alumina source"). It is preferable that the raw material composition contain an amorphous aluminosilicate as silica-alumina source.

Preferably, the alkali source is a potassium source. The potassium source is a compound containing potassium, preferably at least one selected from the group consisting of a potassium-containing hydroxide, chloride, bromide and iodide, more preferably at least one selected from the group consisting of a hydroxide, chloride and bromide of potassium, still more preferably a hydroxide of potassium.

The raw material composition may contain an alkali source other than the potassium source. The alkali source in the present embodiment is particularly a compound containing an alkali metal other than potassium, preferably at least one selected from the group consisting of a hydroxide, a chloride, a bromide or an iodide, which contains at least one selected from the group consisting of lithium, sodium, rubidium and cesium. More preferably, the alkali source is a compound containing sodium (hereinafter also referred to as "sodium source"). The sodium source is preferably at least one selected from a hydroxide, chloride or bromide of sodium, and more preferably a hydroxide of sodium.

Preferably, the tetraethylammonium cation source (hereinafter also referred to as "TEA source") is a compound comprising tetraethylammonium cation (hereinafter also referred to as "$TEA^+$"), i.e., a compound comprising $TEA^+$ and a counter anion thereof. $TEA^+$ is a quaternary ammonium cation represented by the following general formula, and functions as an organic structure directing agent (hereinafter also referred to as "SDA") to direct formation of a β-type structure.

[Formula 1]

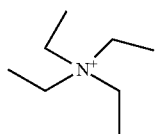

Preferably, the TEA source is a salt of tetraethylammonium (hereinafter also referred to as "TEA"), preferably at least one selected from the group consisting of a hydroxide, chloride, bromide, iodide, carbonate monoester salt, sulfate monoester salt, nitrate and sulfate of TEA, more preferably at least one selected from the group consisting of a hydroxide, chloride, bromide iodide, nitrate and sulfate of TEA, still more preferably at least one selected from the group consisting of a hydroxide, chloride and bromide of TEA, particularly preferably a hydroxide of TEA. As long as the raw material composition contains $TEA^+$ as a quaternary ammonium cation, it may not contain a quaternary ammonium cation other than $TEA^+$.

Preferred examples of the water contained in the raw material composition include deionized water and pure water.

The alumina source, the silica source, the TEA source, the potassium source and the alkali source each may have the function of another raw material. In the case where each of the raw materials is a water-containing substance, a hydrate or an aqueous solution, the water contained in the raw materials is also regarded as water contained in the raw material composition.

Preferably, the raw material composition contains no fluorine (F)-containing compound, preferably no fluorine. Preferably, the fluorine content in the raw material composition is 100 ppm by weight or less, preferably 1 ppm by weight or less, more preferably equal to or less than the detection limit in composition analysis.

Examples of the fluorine-containing compound include fluorides such as hydrogen fluoride (HF), a quaternary ammonium fluoride, and an alkali metal fluoride. Examples of the quaternary ammonium fluoride salt include tetraethylammonium fluoride (hereinafter also referred to as "TEAF"). Examples of the alkali metal fluoride include any one of sodium fluoride and potassium fluoride.

The molar ratio of potassium to silica in the raw material composition (hereinafter also referred to as "$K/SiO_2$ ratio") is more than 0.04. Through crystallization of the raw material composition having a $K/SiO_2$ ratio in the range, even though having an $SiO_2/Al_2O_3$ ratio of less than 20, a β-zeolite with a heat resistance equal to or more than that of β-zeolites having an $SiO_2/Al_2O_3$ ratio of 20 or more can be obtained.

Preferably, the $K/SiO_2$ ratio is more than 0.04 and less than 0.70, preferably 0.05 or more and 0.30 or less, more preferably 0.10 or more and 0.20 or less, still more preferably 0.12 or more and 0.16 or less. With a $K/SiO_2$ ratio of 0.15 or less, a by-product zeolite tends to be hardly formed, so that it is preferable that the $K/SiO_2$ ratio be 0.12 or more and 0.15 or less.

Preferably, the molar ratio of sodium to silica in the raw material composition (hereinafter also referred to as "$Na/SiO_2$ ratio") is 0 or more and less than 0.10, including, for example, 0 or more and 0.06 or less, 0 or more and 0.04 or less, and 0 or more and 0.01 or less. The $Na/SiO_2$ ratio of the raw material composition may be 0, i.e., the raw material composition may contain substantially no sodium.

Preferably, the molar ratio of $TEA^+$ to silica in the raw material composition (hereinafter also referred to as "$TEA/SiO_2$ ratio") is 0.03 or more and 0.30 or less, preferably 0.03 or more and 0.20 or less, more preferably 0.05 or more and 0.15 or less, still more preferably 0.10 or more and 0.15 or less.

Preferably, the molar ratio of silica to alumina ($SiO_2/Al_2O_3$ ratio) in the raw material composition is 10.0 or more and 50.0 or less, preferably 10.0 or more and 40.0 or less, more preferably 12.0 or more and 25.0 or less, still more preferably 14.5 or more and 20.0 or less. Since crystallized products tend to have difficulty in containing a crystal phase other than the β-type structure, the $SiO_2/Al_2O_3$ ratio in the raw material composition is preferably 15.0 or more and 20.0 or less, more preferably 17.0 or more and 19.5 or less.

Preferably, the molar ratio of water ($H_2O$) to silica in the raw material composition (hereinafter also referred to as "$H_2O/SiO_2$ ratio") is 5.0 or more and 50.0 or less, preferably 5.0 or more and 30.0 or less, more preferably 10.0 or more and 20.0 or less, still more preferably 10.0 or more and 14.0 or less.

Preferably, the molar ratio of hydroxyl group anion (OH⁻) to silica in the raw material composition (hereinafter also referred to as "OH/SiO$_2$ ratio") is 0.10 or more and 1.00 or less, more preferably 0.15 or more and 0.50 or less, still more preferably 0.15 or more and 0.40 or less.

Preferably, the raw material composition contains a seed crystal, and it is preferable that the seed crystal be a β-zeolite.

Preferably, the seed crystal content is 0 wt % or more and 10 wt % or less, preferably 0 wt % or more and 5 wt % or less, more preferably 0.1 wt % or more and 1.9 wt % or less.

The seed crystal content in the present invention is a value determined by the following equation.

Seed crystal content (wt %)={(w3+w4)/(w1+w2)}×100

In the above equation, w1 is the weight of Al in the raw material composition (excluding seed crystal) in terms of Al$_2$O$_3$, w2 is the weight of Si in the raw material composition (excluding seed crystal) in terms of SiO$_2$, w3 is the weight of Al in the seed crystal in terms of Al$_2$O$_3$, and w4 is the weight of Si in the seed crystal in terms of SiO$_2$.

Preferably, the raw material composition has the following molar composition, which is preferably in any combination selected from the values described below.

SiO$_2$/Al$_2$O$_3$ ratio=10.0 or more and 50.0 or less,
preferably 12.0 or more and 22.0 or less,
more preferably, 13.0 or more and 20.0 or less.
TEA/SiO$_2$ ratio=0.03 or more and 0.30 or less,
preferably 0.05 or more and 0.22 or less
more preferably, 0.06 or more and 0.20 or less.
K/SiO$_2$ ratio=more than 0.04 and less than 0.70,
preferably 0.05 or more and 0.25 or less,
more preferably, 0.05 or more and 0.17 or less.
Na/SiO$_2$ ratio=0 or more and less than 0.10,
preferably 0 or more and 0.05 or less,
more preferably, 0 or more and 0.01 or less.
H$_2$O/SiO$_2$ ratio=5.0 or more and 50.0 or less,
preferably 8.0 or more and 15.0 or less,
more preferably 11.0 or more and 14.0 or less.
OH/SiO$_2$ ratio=0.10 or more and 1.00 or less,
preferably, 0.15 or more and 0.40 or less.
Seed crystal=0 wt % or more and 10 wt % or less,
preferably, 0.1 wt % or more and 3 wt % or less.

Preferably, the raw material composition is crystallized by hydrothermal synthesis. The hydrothermal synthesis may be performed by filling a container with the raw material composition and heating the sealed container. The crystallization may be performed either in a static state or in an agitated state, and it is preferable to perform crystallization in an agitated state.

Preferably, the crystallization temperature is 100° C. or more and 180° C. or less, preferably 120° C. or more and 170° C. or less, more preferably 140° C. or more and 160° C. or less.

The crystallization time is the time required for the β-zeolite to be crystallized from the raw material composition, depending on the crystallization temperature. As the crystallization temperature rises, the crystallization time tends to be shortened. Preferably, the crystallization time in the crystallization step is 5 hours or more and less than 72 hours (3 days), preferably 5 hours or more and 50 hours or less.

Through the crystallization step, a β-zeolite in a state containing TEA⁺ is obtained. It is considered that TEA⁺ is mainly contained in the pores of the β-zeolite. Preferably, the β-zeolite obtained in the crystallization step has at least the following XRD peaks in the XRD measurement with a CuKα ray as radiation source.

TABLE 4

| | Relative intensity* | |
|---|---|---|
| 2 θ | Preferred range | More preferred range |
| 21.28°~21.40° | 10 or more and 20 or less | 11 or more and 16 or less |
| 22.33°~22.46° | 100 | 100 |
| 25.16°~25.30° | 5 or more and 15 or less | 5 or more and 10 or less |
| 26.74°~26.90° | 10 or more and 20 or less | 12 or more and 17 or less |
| 29.32°~29.56° | 10 or more and 25 or less | 12 or more and 20 or less |

*Relative intensity is an intensity relative to peak intensity at 2θ = 22.33 to 22.46°.

Preferably, the XRD peaks in the above table are those of the β-zeolite in a state containing TEA⁺.

Preferably, the characteristics of the β-zeolite crystallized in the crystallization step, which are obtained by measurements other than XRD measurement, such as the SiO$_2$/Al$_2$O$_3$ ratio, the fluorine content and the grain shape are the same as those of the β-zeolite in the present embodiment.

Preferably, the method for producing a β-zeolite in the present embodiment comprises at least one selected from a washing step, an ion exchange step, a drying step and an organic structure directing agent removal step, after the crystallization step.

In the washing step, the β-zeolite after crystallization and the liquid phase are solid-liquid separated. In the washing step, the solid-liquid separation may be performed by a known method, and β-type zeolite obtained as a solid phase may be washed with pure water.

The β-zeolite after crystallization may have a metal ion such as an alkali metal ion in the ion exchange site. In the ion exchange step, the metal ion is ion-exchanged with a nonmetallic cation such as an ammonium ion (NH$_4^+$) and a proton (H⁺). The ion exchange with an ammonium ion includes mixing and stirring the β-zeolite in an aqueous ammonium chloride solution. The ion exchange with a proton includes ion-exchanging the β-zeolite with ammonium ion, and then calcining the ion-exchanged β-zeolite.

In the drying step, moisture is removed from the β-zeolite after the crystallization step or the washing step. Although the conditions for the drying step are arbitrary, examples thereof include allowing the β-zeolite after the crystallization step or the washing step to stand still in the atmosphere at 50° C. or more and 150° C. or less for 2 hours or more.

In the organic structure directing agent removal step, TEA⁺ contained in the β-zeolite is mainly removed. The method for removing TEA⁺ is arbitrary, and examples thereof include a treatment in the atmosphere at a temperature of 450° C. or more and 650° C. or less.

The production method in the present embodiment can be used as a method for producing a β-zeolite, applicable to a method for producing a β-zeolite on a large-scale, particularly such as an industrial method for producing a β-zeolite.

Preferably, the method for producing a β-zeolite in the present embodiment comprises a step of contacting a β-zeolite with a metal to obtain a metal-containing β-zeolite (hereinafter also referred to as "a metal incorporation step"). By containing a metal, the β-zeolite exhibits high nitrogen oxide reduction characteristics as a catalyst for reducing nitrogen oxides, and the nitrogen oxide reduction ratio in a low temperature range hardly decreases after exposure to high temperature and high humidity.

The mixing method in the metal incorporation step is arbitrary, so long as the method allows a metal to be contained in at least any one of the ion exchange site and pore of the β-zeolite.

Specific examples of the mixing method include at least one selected from the group consisting of an ion exchange method, an evaporation-to-dryness method and an impregnation support method, and an impregnation support method and a method for mixing an aqueous solution containing a metal source with a β-zeolite are preferred.

The metal source is at least one of a metal and a metal compound, preferably a transition metal or a transition metal compound. Preferably, the metal source is at least one selected from the group consisting of an oxide, a hydroxide, an oxyhydroxide, a sulfate, a nitrate, a chloride and an acetate of a transition metal, more preferably at least one selected from the group consisting of a sulfate, a nitrate, a chloride and an acetate, more preferably a nitrate.

Preferably, the metal which a metal source contains is at least one of iron and copper, and iron is preferred.

The method for producing a β-zeolite in the present embodiment may comprise at least one or more steps selected from a washing step, a drying step and an activation step, after the metal incorporation step.

As the washing step, an arbitrary washing step may be employed so long as impurities can be removed. For example, the resulting metal-containing β-zeolite may be washed with sufficient amount of pure water after the metal incorporation step.

The drying step may be any method so long as the moisture adsorbed on the metal-containing β-zeolite can be removed, and examples thereof include processing in an atmosphere at 100° C. or more and 200° C. or less.

In the activation step, inorganic substances or organic substances remaining in the metal-containing β-zeolite are removed. Examples of the activation step include processing the metal-containing β-zeolite in an atmosphere at more than 200° C. and 600° C. or less.

BRIEF DESCRIPTION OF DRAWINGS

FIG. 1(a) showing a double quadrangular frustum shape, FIG. 1(b) showing an approximately octahedron shape.

EXAMPLES

Figure 1:
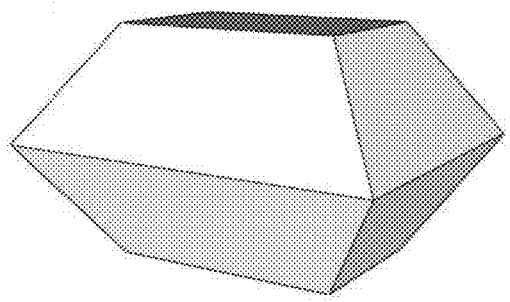
FIG. 1(a) and FIG. 1(b) are schematic views showing a shape of a crystal particle of β-zeolite.

Hereinafter, the present invention will be more specifically described with reference to Examples and Comparative Examples. However, the present invention is not limited to the following Examples. The evaluation methods and the evaluation conditions are shown as follows.

(Identification of Crystal)

A powder X-ray diffractometer (apparatus name: Ultima IV, manufactured by Rigaku Corporation) was used to perform XRD measurement of the samples. The measurement conditions are as follows.

Radiation source: CuKα ray (λ=1.5405 Angstrom)
Measurement mode: step scan
Scan condition: 40°/min
Measurement time: 3 seconds
Measurement range: 2θ=5° to 43°

After the structure was identified by comparing the resulting XRD pattern with XRD patterns in U.S. Pat. No. 3,308,069, 2θ and FWHM of $Peak_{(302)}$, $I_{(302)}$ and $I_{by-pro}$ were determined.

(Composition Analysis)

A sample was dissolved in a mixed aqueous solution of hydrofluoric acid and nitric acid to prepare a sample solution. The sample solution was measured by inductively coupled plasma emission spectroscopy (ICP-AES) using an ICP apparatus (apparatus name: OPTIMA 5300 DV, manufactured by PerkinElmer, Inc.).

(Average Crystal Particle Size)

The sample was observed at a magnification of 15000 times using an electron microscope (apparatus name: JSM-6390 LV), and the horizontal Feret sizes of 150 primary crystal particles were measured. The obtained horizontal Feret sizes were averaged to obtain an average crystal particle size.

(IR Spectrum)

The IR spectrum was measured using an FT-IR apparatus (apparatus name: 660-IR, manufactured by Varian, Inc.) with a heat diffusivity reflection apparatus (apparatus name: ST 900° C. heat diffusivity reflection apparatus, manufactured by ST Japan Inc.) under the following conditions.

Measurement Method: Heat Permeation Method Pretreatment: Temperature was retained at 500° C. for 2 hours under vacuum evacuation. Measurement was performed after the temperature was lowered to room temperature.

Measurement temperature: 500° C.
Measurement wave number range: 800 to 4000 $cm^{-1}$
Resolution: 2 $cm^{-1}$
Number of acquisitions: 128

Example 1

After mixing a 35 wt % TEAOH aqueous solution, a 48 wt % potassium hydroxide aqueous solution, pure water and amorphous aluminosilicate ($SiO_2/Al_2O_3$ ratio=18.2), a β-zeolite (product name: HSZ930NHA, manufactured by Tosoh Corporation) was added as seed crystal thereto by 1.5 wt % to obtain a raw material composition having the following molar composition.

$SiO_2/Al_2O_3$ ratio=18.2
$TEA/SiO_2$ ratio=0.12
$K/SiO_2$ ratio=0.12
$H_2O/SiO_2$ ratio=12.0

OH/SiO$_2$ ratio=0.24

Seed crystal=1.5 wt %

The raw material composition filled in a closed sealed container was reacted at 150° C. for 48 hours while rotating the container at 55 rpm to obtain a crystallized product. The resulting crystallized product was subjected to solid-liquid separation, washed with pure water, dried in an atmosphere at 110° C., and collected. The crystallized product was a zeolite made of a single phase of β-zeolite having an FWHM of Peak$_{(302)}$ of 0.20.

Figure 2:
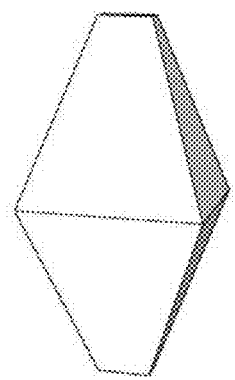
FIG. 2 shows an XRD pattern of a crystallized product in Example 1.
Figure 2:
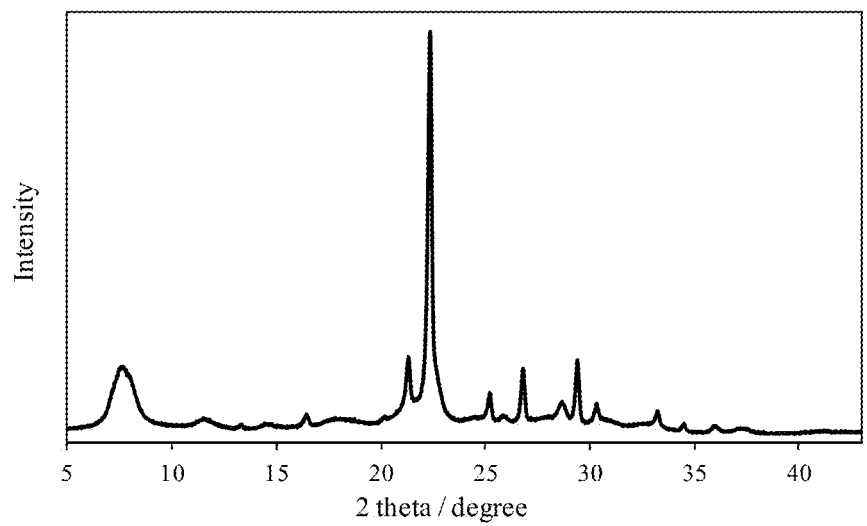

The main XRD peaks of the resulting crystallized product are shown in the following table, and the XRD pattern is shown in FIG. 2.

TABLE 5

| 2θ | Relative intensity* |
|---|---|
| 21.32 | 14 |
| 22.34 | 100 |
| 25.20 | 8 |
| 26.80 | 14 |
| 29.40 | 16 |

*Relative intensity is an intensity relative to peak intensity at 2θ = 22.34°.

Figure 3:
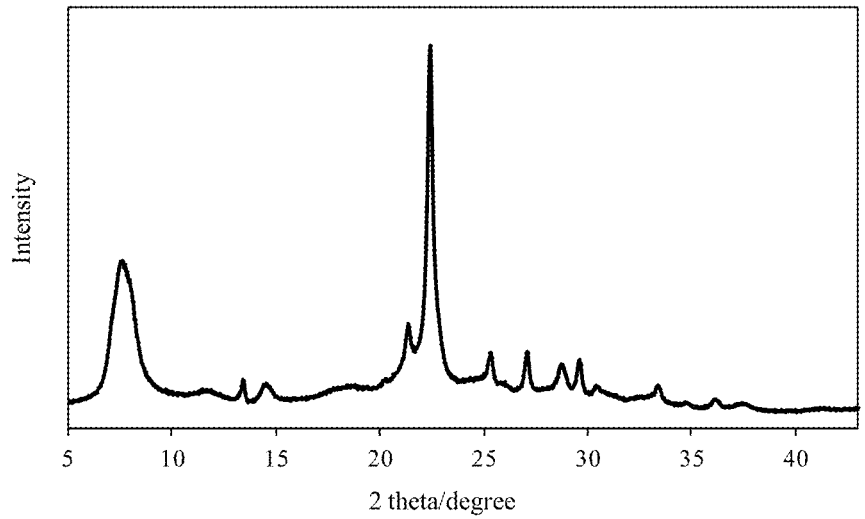
FIG. 3 shows an XRD pattern of a β-zeolite in Example 1.

The resulting crystallized product was calcined in an atmosphere at 600° C. for 2 hours to obtain a β-zeolite in the present Example. The β-zeolite in the present Example was a zeolite made of a single phase of β-zeolite having an FWHM of Peak$_{(302)}$ of 0.27 and an FWHM change ratio of 1.35. The SiO$_2$/Al$_2$O$_3$ ratio was 17.6, the average crystal particle size was 0.37 μm, and both the SiO$_2$/Al$_2$O$_3$ ratio and the average crystal particle size were the values similar to those of the crystallized product before calcination. The main XRD peaks of the resulting β-zeolite are shown in the following table, and the XRD pattern is shown in FIG. 3.

TABLE 6

| 2θ | Relative intensity* |
|---|---|
| 13.42° | 8 |
| 21.32° | 14 |
| 22.38° | 100 |
| 25.26° | 13 |
| 27.02° | 16 |
| 28.58° | 10 |
| 29.52° | 16 |

*Relative intensity is an intensity relative to peak intensity at 2θ = 22.38°.

Example 2

The crystallization, solid-liquid separation, washing and drying were performed in the same manner as in Example 1 to obtain a crystallized product, except that composition of the raw material composition was set to the following.

SiO$_2$/Al$_2$O$_3$ ratio=18.2

TEAOH/SiO$_2$ ratio=0.09

K/SiO$_2$ ratio=0.15

H$_2$O/SiO$_2$ ratio=12.0

OH/SiO$_2$ ratio=0.24

Seed crystal=1.5 wt %

The resulting crystallized product was a zeolite made of a single phase of β-zeolite having an FWHM of Peak$_{(302)}$ of 0.18. The main XRD peaks of the crystallized product are shown in the following table.

TABLE 7

| 2θ | Relative intensity* |
|---|---|
| 21.32° | 14 |
| 22.36° | 100 |
| 25.22° | 8 |
| 26.82° | 15 |
| 29.42° | 17 |

*Relative intensity is an intensity relative to peak intensity at 2θ = 22.36°.

The crystallized product was calcined in the same manner as in Example 1 to obtain a β-zeolite in the present example. The β-zeolite in the present Example was a zeolite made of a single phase of β-zeolite having an FWHM of Peak$_{(302)}$ of 0.28 and an FWHM change ratio of 1.56. The SiO$_2$/Al$_2$O$_3$ ratio was 17.4, the average crystal particle size was 0.38 μm, and both were the values similar to those of the crystallized product before calcination.

The main XRD peaks of the β-zeolite in the present Example are shown in the following table.

TABLE 8

| 2θ | Relative intensity* |
|---|---|
| 13.44° | 7 |
| 21.30° | 13 |
| 22.36° | 100 |
| 25.26° | 14 |
| 27.02° | 16 |
| 28.62° | 9 |
| 29.52° | 18 |

*Relative intensity is an intensity relative to peak intensity at 2θ = 22.38°.

Example 3

The crystallization, solid-liquid separation, washing and drying were performed in the same manner as in Example 1 to obtain a crystallized product, except that composition of the raw material composition was set to the following.

SiO$_2$/Al$_2$O$_3$=18.2

TEAOH/SiO$_2$=0.12

K/SiO$_2$=0.20

H$_2$O/SiO$_2$=12.0

OH/SiO$_2$=0.32

Seed crystal=1.5 wt %

The resulting crystallized product had a β-type structure content of 93%, and contained 7% GIS-type zeolite. The FWHM of Peak$_{(302)}$ of the β-zeolite contained in the zeolite was 0.18.

The main XRD peaks of the crystallized product are shown in the following table.

TABLE 9

| 2θ | Relative intensity* |
|---|---|
| 21.32° | 12 |
| 22.36° | 100 |
| 25.20° | 8 |
| 26.80° | 15 |
| 29.40° | 16 |

*Relative intensity is an intensity relative to peak intensity at 2θ = 22.36°.

The resulting crystallized product was calcined in the same manner as in Example 1 to obtain a β-zeolite in the present Example. The β-zeolite in the present Example was a zeolite made of a single phase of β-zeolite having an FWHM of Peak$_{(302)}$ of 0.28 and an FWHM change ratio of 1.56. The SiO$_2$/Al$_2$O$_3$ ratio was 15.6, the average crystal particle size was 0.52 µm, and both were the values similar to those of the β-zeolite before calcination.

From the XRD measurement results of the β-zeolite in the present Example, it was confirmed that a very small amount of GIS-type zeolite contained in the β-zeolite after crystallization disappeared by calcination.

Figure 4:
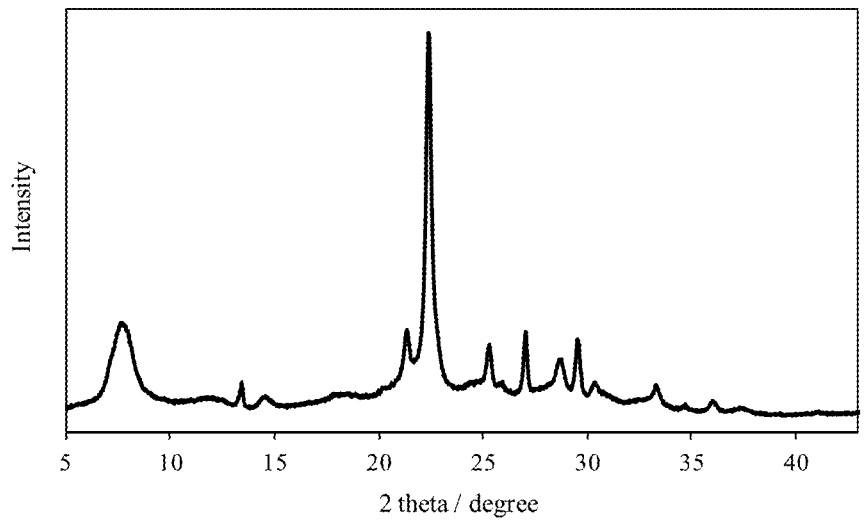
FIG. 4 shows an XRD pattern of a β-zeolite in Example 3.
Figure 5:
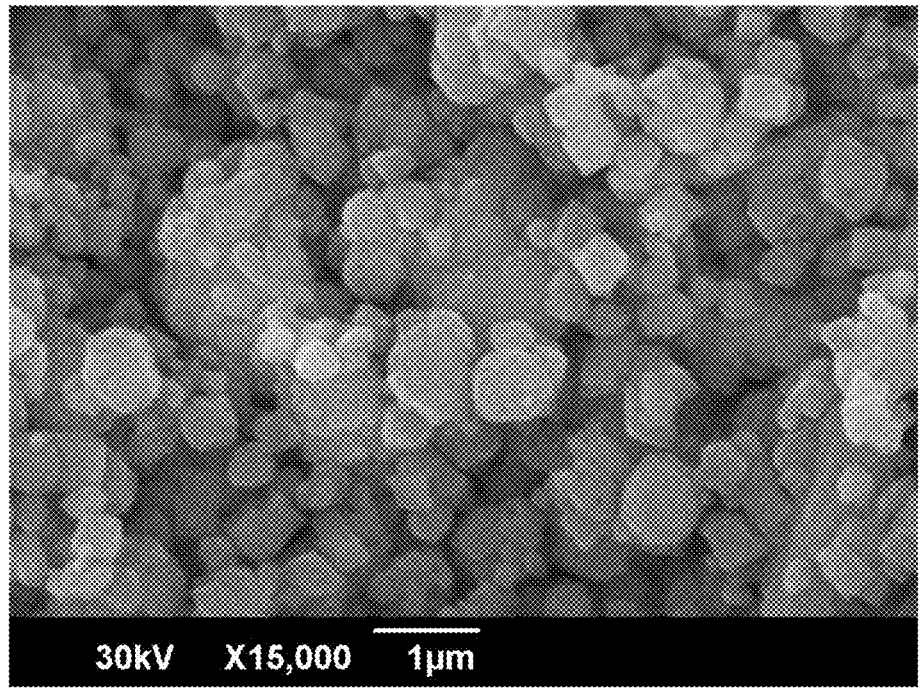
FIG. 5 shows an SEM observation view of a β-zeolite in Example 3 (scale in drawing: 1 μm).

The main XRD peaks of the β-zeolite in the present Example are shown in the following table, the XRD pattern is shown in FIG. 4, and the SEM observation view is shown in FIG. 5.

TABLE 10

| 2θ | Relative intensity* |
|---|---|
| 13.44° | 7 |
| 21.34° | 13 |
| 22.40° | 100 |
| 25.30° | 13 |
| 27.04° | 19 |
| 28.64° | 9 |
| 29.54° | 17 |

*Relative intensity is an intensity relative to peak intensity at 2θ = 22.40°.

Example 4

The crystallization, solid-liquid separation, washing and drying were performed in the same manner as in Example 1 to obtain a crystallized product, except that composition of the raw material composition was set to the following.

SiO$_2$/Al$_2$O$_3$ ratio=18.2
TEAOH/SiO$_2$ ratio=0.10
K/SiO$_2$ ratio=0.16
H$_2$O/SiO$_2$ ratio=12.0
OH/SiO$_2$ ratio=0.26
Seed crystal=1.5 wt %

The resulting crystallized product had a β-type structure content of 95%, and contained 5% GIS-type zeolite. The FWHM of Peak$_{(302)}$ of the β-zeolite contained in the zeolite was 0.19.

The main XRD peaks of the crystallized product are shown in the following table.

TABLE 11

| 2θ | Relative intensity* |
|---|---|
| 21.34° | 12 |
| 22.34° | 100 |
| 25.22° | 8 |
| 26.80° | 15 |
| 29.40° | 17 |

*Relative intensity is an intensity relative to peak intensity at 2θ = 22.34°.

The crystallized product was calcined in the same manner as in Example 1 to obtain a β-zeolite in the present Example. The β-zeolite in the present Example was a zeolite made of a single phase of β-zeolite having an FWHM of Peak$_{(302)}$ of 0.28 and an FWHM change ratio of 1.47. The SiO$_2$/Al$_2$O$_3$ ratio was 16.8, the average crystal particle size was 0.44 µm, and both were the values similar to those of the zeolite before calcination.

The main XRD peaks of the β-zeolite in the present Example are shown in the following table.

TABLE 12

| 2θ | Relative intensity* |
|---|---|
| 13.42° | 7 |
| 21.32° | 14 |
| 22.38° | 100 |
| 25.28° | 13 |
| 27.02° | 16 |
| 28.62° | 9 |
| 29.52° | 16 |

*Relative intensity is an intensity relative to peak intensity at 2θ = 22.38°.

Example 5

The crystallization, solid-liquid separation, washing and drying were performed in the same manner as in Example 1 to obtain a crystallized product, except that composition of the raw material composition having the same composition as in Example 4 was used and the crystallization temperature was set to 140° C.

The resulting crystallized product was a zeolite made of a single phase of β-zeolite.

The crystallized product was calcined in the same manner as in Example 1 to obtain a β-zeolite in the present Example. The β-zeolite in the present Example was a zeolite made of a single phase of β-zeolite having an FWHM of Peak$_{(302)}$ of 0.38. The SiO$_2$/Al$_2$O$_3$ ratio was 17.5, the average crystal particle size was 0.40 µm, and both were the values similar to those of the crystallized product before calcination.

The main XRD peaks of the β-zeolite in the present Example are shown in the following table.

TABLE 13

| 2θ | Relative intensity* |
|---|---|
| 13.44° | 8 |
| 21.32° | 12 |
| 22.40° | 100 |
| 25.30° | 13 |
| 27.06° | 17 |
| 28.62° | 9 |
| 29.56° | 15 |

*Relative intensity is an intensity relative to peak intensity at 2θ = 22.40°.

Example 6

The crystallization, solid-liquid separation, washing and drying were performed in the same manner as in Example 1 to obtain a crystallized product, except that composition of the raw material composition was set to the following, and the crystallization temperature was set to 170° C.

SiO$_2$/Al$_2$O$_3$ ratio=18.2
TEAOH/SiO$_2$ ratio=0.09
K/SiO$_2$ ratio=0.12
H$_2$O/SiO$_2$ ratio=12.0
OH/SiO$_2$ ratio=0.21
Seed crystal=1.5 wt %

The resulting crystallized product was a zeolite made of a single phase of β-zeolite.

The crystallized product was calcined in the same manner as in Example 1 to obtain a β-zeolite in the present Example. The β-zeolite in the present Example was a zeolite made of a single phase of β-zeolite having an FWHM of Peak$_{(302)}$ of 0.40. The SiO$_2$/Al$_2$O$_3$ ratio was 18.0, the average crystal particle size was 0.38 µm, and both were the values similar to those of the crystallized product before calcination.

The main XRD peaks of the β-zeolite in the present Example are shown in the following table.

TABLE 14

| 2θ | Relative intensity* |
|---|---|
| 13.44° | 7 |
| 21.32° | 12 |
| 22.38° | 100 |
| 25.28° | 12 |
| 27.06° | 14 |
| 28.66° | 11 |
| 29.54° | 13 |

*Relative intensity is an intensity relative to peak intensity at 2θ = 22.38°.

Example 7

The crystallization, solid-liquid separation, washing and drying were performed in the same manner as in Example 1 to obtain a crystallized product, except that an amorphous aluminosilicate having an $SiO_2/Al_2O_3$ ratio of 14.8 was used and composition of the raw material composition was set to the following.
  $SiO_2/Al_2O_3$ ratio=14.8
  $TEAOH/SiO_2$ ratio=0.12
  $K/SiO_2$ ratio=0.14
  $H_2O/SiO_2$ ratio=12.0
  $OH/SiO_2$ ratio=0.26
  Seed crystal=1.5 wt %

The resulting crystallized product had a β-zeolite content of 86%, and contained 14% GIS-type zeolite. The FWHM of Peak$_{(302)}$ of the β-zeolite contained in the crystallized product was 0.19.

The main XRD peaks of the crystallized product are shown in the following table.

TABLE 15

| 2θ | Relative intensity* |
|---|---|
| 21.30° | 14 |
| 22.36° | 100 |
| 25.22° | 7 |
| 26.78° | 13 |
| 29.42° | 15 |

*Relative intensity is an intensity relative to peak intensity at 2θ = 22.36°.

The crystallized product was calcined in the same manner as in Example 1 to obtain a β-zeolite in the present Example. The β-zeolite in the present Example had a β-type structure content of 89% and contained an 11% GIS-type zeolite. The β-zeolite in the crystallized product had an FWHM of Peak$_{(302)}$ of 0.26 and an FWHM change ratio of 1.37. The $SiO_2/Al_2O_3$ ratio was 14.2 and the average crystal particle size was 0.39 μm, which were the values similar to those of the crystallized product before calcination, respectively.

From the present Example, it was confirmed that 14% or more of the by-product zeolite decreased by calcination and remained after calcination.

The main XRD peaks of the β-zeolite in the present Example are shown in the following table.

TABLE 16

| 2θ | Relative intensity* |
|---|---|
| 13.40° | 7 |
| 21.32° | 12 |
| 22.38° | 100 |
| 25.28° | 12 |
| 27.00° | 13 |
| 28.62° | 8 |
| 29.52° | 16 |

*Relative intensity is an intensity relative to peak intensity at 2θ = 22.38°.

Example 8

The crystallization, solid-liquid separation, washing and drying were performed in the same manner as in Example 1 to obtain a crystallized product, except that an amorphous aluminosilicate having an $SiO_2/Al_2O_3$ ratio of 14.8 was used and composition of the raw material composition was set to the following.
  $SiO_2/Al_2O_3$ ratio=14.8
  $TEAOH/SiO_2$ ratio=0.09
  $K/SiO_2$ ratio=0.16
  $H_2O/SiO_2$ ratio=12.0
  $OH/SiO_2$ ratio=0.25
  Seed crystal=1.5 wt %

The resulting crystallized product had a β-type structure content of 84%, and contained 16% GIS-type zeolite. The FWHM of Peak$_{(302)}$ of the β-zeolite contained in the crystallized product was 0.18.

The main XRD peaks of the crystallized product are shown in the following table.

TABLE 17

| 2θ | Relative intensity* |
|---|---|
| 21.32° | 13 |
| 22.34° | 100 |
| 25.24° | 7 |
| 26.82° | 13 |
| 29.40° | 15 |

*Relative intensity is an intensity relative to peak intensity at 2θ = 22.34°.

The crystallized product was calcined in the same manner as in Example 1 to obtain a β-zeolite in the present Example. The β-zeolite in the present Example had a β-type structure content of 92% and contained an 8% GIS-type zeolite. The β-zeolite in the present Example had an FWHM of Peak$_{(302)}$ of 0.27 and an FWHM change ratio of 1.50. The $SiO_2/Al_2O_3$ ratio was 14.2 and the average crystal particle size was 0.45 μm, which were the values similar to those of the zeolite before calcination, respectively.

From the present Example, it was confirmed that 16% or more of the by-product zeolite decreased by calcination but remained after calcination.

The main XRD peaks of the β-zeolite in the present Example are shown in the following table.

TABLE 18

| 2θ | Relative intensity* |
|---|---|
| 13.42° | 8 |
| 21.34° | 13 |
| 22.38° | 100 |
| 25.28° | 13 |
| 27.02° | 15 |
| 28.62° | 9 |
| 29.52° | 15 |

*Relative intensity is an intensity relative to peak intensity at 2θ = 22.38°.

Example 9

After mixing a 35 wt % TEAOH aqueous solution, a 48 wt % potassium hydroxide aqueous solution, a 48 wt % sodium hydroxide aqueous solution, pure water and an amorphous aluminosilicate ($SiO_2/Al_2O_3$ ratio=18.2), a β-zeolite (product name: HSZ930NHA, manufactured by Tosoh Corporation) was added as seed crystal by 1.5 wt % to the mixture to obtain a raw material composition having the following molar composition.

$SiO_2/Al_2O_3$=18.2
$TEA/SiO_2$=0.12
$K/SiO_2$=0.12
$Na/SiO_2$=0.04
$H_2O/SiO_2$=12.0
$OH/SiO_2$=0.28
Seed crystal=1.5 wt %

The raw material composition was treated in the same manner as in Example 1, so that a crystallized product was obtained. The crystallized product was a zeolite made of a single phase of β-zeolite, having an FWHM of $Peak_{(302)}$ of 0.22. The main XRD peaks of the resulting crystallized product are shown in the following table.

TABLE 19

| 2θ | Relative intensity* |
|---|---|
| 21.32 | 14 |
| 22.34 | 100 |
| 25.24 | 7 |
| 26.80 | 14 |
| 29.40 | 16 |

*Relative intensity is an intensity relative to peak intensity at 2θ = 22.34°.

The resulting crystallized product was calcined in the same manner as in Example 1 to make a β-zeolite in the present Example. The β-zeolite in the present Example was a zeolite made of a single phase of β-zeolite and had an FWHM of $Peak_{(302)}$ of 0.29 and an FWHM change ratio of 1.32. The $SiO_2/Al_2O_3$ ratio was 17.2 and the average crystal particle size was 0.35 μm, which were the values similar to those of the crystallized product before calcination, respectively. The main XRD peaks of the resulting β-zeolite are shown in the following table.

TABLE 20

| 2θ | Relative intensity* |
|---|---|
| 13.42° | 8 |
| 21.32° | 13 |
| 22.38° | 100 |
| 25.26° | 13 |
| 27.02° | 16 |
| 28.58° | 10 |
| 29.50° | 16 |

*Relative intensity is an intensity relative to peak intensity at 2θ = 22.38°.

The IR spectrum of the β-zeolite had P1 and P2 at 3733 $cm^{-1}$ and 3591 $cm^{-1}$, respectively. Also, P2/P1 was 0.28.

Example 10

After mixing a 35 wt % TEAOH aqueous solution, a 48 wt % potassium hydroxide aqueous solution, pure water and an amorphous aluminosilicate ($SiO_2/Al_2O_3$ ratio=17.4), a β-zeolite (product name: HSZ930NHA, manufactured by Tosoh Corporation) was added as seed crystal by 1.5 wt % to the mixture to obtain a raw material composition having the following molar composition.

$SiO_2/Al_2O_3$ ratio=17.4
$TEA/SiO_2$ ratio=0.09
$K/SiO_2$ ratio=0.16
$H_2O/SiO_2$ ratio=11.0
$OH/SiO_2$ ratio=0.25
Seed crystal=1.5 wt %

The raw material composition filled in a 4-L autoclave was agitated at 245 rpm at 150° C. for 44 hours to cause a reaction of the raw material composition, so that a crystallized product was obtained. The resulting crystallized product was subjected to solid-liquid separation, washed with pure water, and then dried in an atmosphere at 110° C. to be collected. The crystallized product had a β-type structure content of 95% and contained 5% GIS-type zeolite. The FWHM of $Peak_{(302)}$ of the β-zeolite in the crystallized product was 0.19.

The main XRD peaks of the resulting crystallized product are shown in the following table.

TABLE 21

| 2θ | Relative intensity* |
|---|---|
| 21.34 | 12 |
| 22.38 | 100 |
| 25.26 | 8 |
| 26.82 | 14 |
| 29.44 | 15 |

*Relative intensity is an intensity relative to peak intensity at 2θ = 22.38°.

Figure 6:
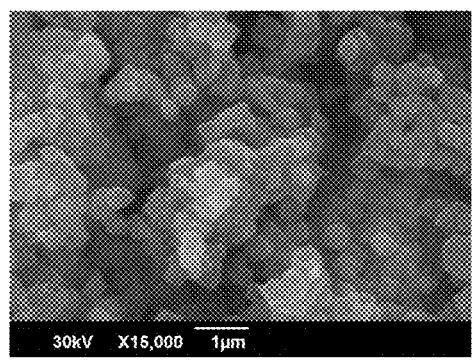
FIG. 6 shows an SEM observation view of a β-zeolite in Example 10 (scale in drawing: 1 μm).

The resulting crystallized product was calcined in an atmosphere at 600° C. for 2 hours to obtain a β-zeolite in the present Example. The β-zeolite in the present Example was a zeolite made of a single phase of β-zeolite having an FWHM of $Peak_{(302)}$ of 0.29 and an FWHM change ratio of 1.53. The $SiO_2/Al_2O_3$ ratio was 16.4, the average crystal particle size was 0.51 μm, and both were the values similar to those of the crystallized product before calcination. The SEM observation view is shown in FIG. 6. The crystal particles are mainly made of primary crystal particles and included a small amount of aggregated crystal particles.

Figure 7:
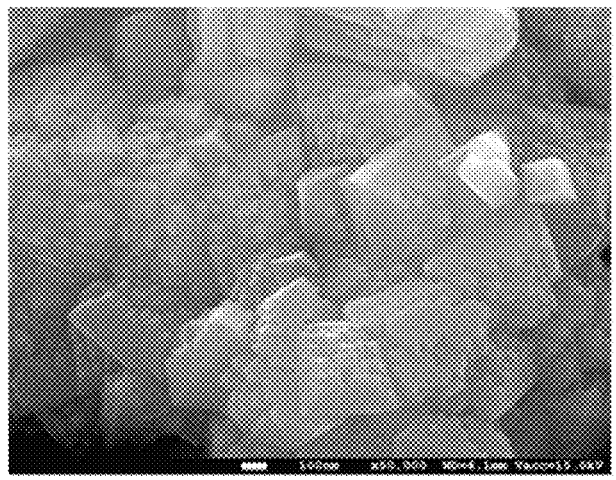
FIG. 7 shows an observation view of crystals of β-zeolite in Example 10 (scale in drawing: 100 nm).

Using a field emission type electron microscope (apparatus name: S-4500, manufactured by Hitachi, Ltd.), crystals constituting an aggregated crystal particle was observed. The results are shown in FIG. 7. The aggregated crystal particle is composed of crystals in a double quadrangular frustum oriented in the a-axis direction and the b-axis direction, and the crystal has an aspect ratio of 0.7.

The main XRD peaks of the resulting β-zeolite are shown in the following table.

TABLE 22

| 2θ | Relative intensity* |
|---|---|
| 13.44° | 12 |
| 21.40° | 11 |
| 22.46° | 100 |
| 25.34° | 12 |
| 27.04° | 16 |
| 28.58° | 6 |
| 29.58° | 12 |

*Relative intensity is an intensity relative to peak intensity at 2θ = 22.46°.

The IR spectrum of the β-zeolite had P1 and P2 at 3731 $cm^{-1}$ and 3592 $cm^{-1}$, respectively. Also, P2/P1 was 0.33.

From these Examples, it was confirmed that a β-zeolite having a $Peak_{(302)}$ of 0.15 or more and 0.50 or less and an SiO$_2$/Al$_2$O$_3$ ratio of less than 20 can be obtained by crystallizing a raw material composition containing TEA$^+$ as an organic structure directing agent, having a K/SiO$_2$ ratio of more than 0.04. Further, it was confirmed that the resulting β-zeolite has an average crystal particles size of more than 0.30 μm and is mainly composed of primary crystal particles with less physical agglomeration. The fluorine content in the β-zeolite in the present Example was equal to or less than the detection limit. Since any of the raw material compositions in the production method in the present Example contain no fluorine compound, it is obvious that the resulting β-zeolite has a fluorine content of 100 ppm by weight or less or has no fluorine content.

Comparative Example 1

After mixing a 35 wt % TEAOH aqueous solution, a 48 wt % sodium hydroxide aqueous solution, pure water and amorphous aluminosilicate (SiO$_2$/Al$_2$O$_3$ ratio=18.2), a commercially available β-zeolite (product name: HSZ930NHA, manufactured by Tosoh Corporation) was further added thereto by 1.5 wt % relative to the silica content in the slurry to obtain a raw material composition having the following molar composition.

SiO$_2$/Al$_2$O$_3$ ratio=18.2
TEAOH/SiO$_2$ ratio=0.10
Na/SiO$_2$ ratio=0.14
H$_2$O/SiO$_2$ ratio=12.0
OH/SiO$_2$ ratio=0.24
Seed crystal=1.5 wt %

The raw material composition was crystallized in the same manner as in Example 1 to obtain a crystallized product. The resulting crystallized product was a zeolite made of a single phase of β-zeolite having an FWHM of 0.53.

The zeolite was calcined in an atmosphere at 600° C. for 2 hours to obtain a β-zeolite in the present Comparative Example. The β-zeolite in the present Comparative Example was a zeolite made of a single phase of β-zeolite having an FWHM of the XRD peak corresponding to Peak$_{(302)}$ of 0.59. The SiO$_2$/Al$_2$O$_3$ ratio was 17.7 and the average crystal particle size was less than 0.15 μm, both being comparative to the values before calcination.

The main XRD peaks of the zeolite in the present Comparative Example are shown in the following table.

TABLE 23

| 2θ | Relative intensity* |
|---|---|
| 21.40° | 7 |
| 22.48° | 100 |
| 25.36° | 18 |
| 27.02° | 16 |
| 29.60° | 12 |

*Relative intensity is an intensity relative to peak intensity at 2θ = 22.48°

The IR spectrum of the β-zeolite had P1 and P2 at 3735 cm$^{-1}$ and 3595 cm$^{-1}$, respectively, with P2/P1 of 0.07.

From these results, it was confirmed that the β-zeolite in the present Comparative Example has a larger FWHM and lower crystallinity than the β-zeolite in Examples, being different in the XRD pattern from the β-zeolite in Examples.

From the present Comparative Example, it was confirmed that the zeolite obtained from a raw material composition containing potassium is a β-zeolite having large crystal particles, while the zeolite obtained from a raw material composition containing no potassium is a β-zeolite having small crystal grains.

Comparative Example 2

A β-zeolite was synthesized according to a method described in Example 4 in Patent literature 3.

In other words, crystallization, solid-liquid separation, washing and drying were performed in the same manner as in Example 1 to obtain a crystallized product except that the composition of the reaction composition was set to SiO$_2$:0.034Al$_2$O$_3$:0.05KOH:0.14TEAOH:9.9H$_2$O, and the crystallization time was set to 88 hours.

The resulting crystallized product was a zeolite made of a single phase of β-zeolite.

The zeolite was calcined in the same manner as in Comparative Example 1 to obtain a zeolite in the present Comparative Example. The zeolite in the present Comparative Example was a zeolite made of a single phase of β-zeolite having an FWHM of the XRD peak corresponding to Peak$_{(302)}$ of 0.24. The SiO$_2$/Al$_2$O$_3$ ratio was 29.1 and the average crystal particle size was 0.43 μm, both being comparative to the values of the zeolite before calcination.

Figure 8:
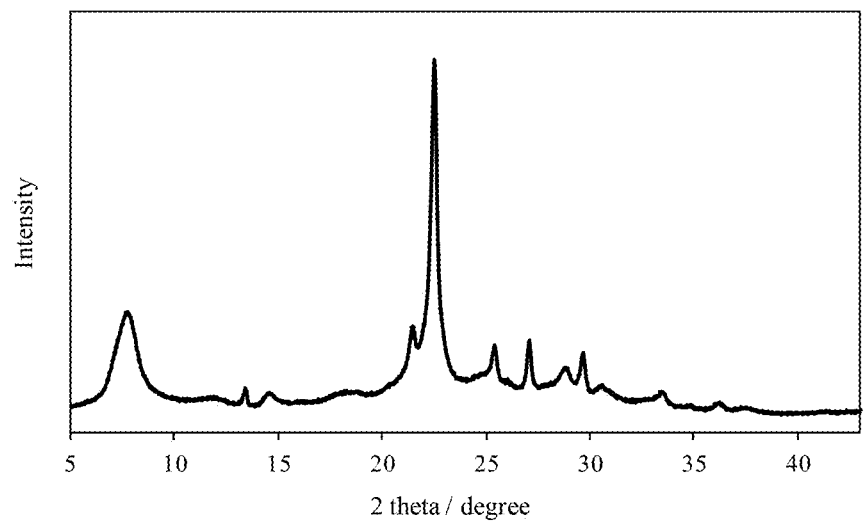
FIG. 8 shows an XRD pattern of a β-zeolite in Comparative Example 2.

The XRD pattern of the zeolite in the present Comparative Example is shown in FIG. 8 and the main XRD peaks are shown in the following table, respectively.

TABLE 24

| 2θ | Relative intensity* |
|---|---|
| 21.46° | 11 |
| 22.52° | 100 |
| 25.40° | 13 |
| 27.08° | 17 |
| 29.66° | 13 |

*Relative intensity is an intensity relative to peak intensity at 2θ = 22.52°.

From these results, it was confirmed that the β-zeolite in the present Comparative Example is different in the XRD pattern from the β-zeolite in the present embodiment, though having crystallinity comparative to that of the β-zeolite in the present embodiment, due to having an SiO$_2$/Al$_2$O$_3$ ratio of 20 or more.

Comparative Example 3

A β-zeolite was synthesized from a raw material composition containing no SDA according to a method described in Example 8 in Patent literature 6.

In other words, after dissolving NaAlO$_2$ and NaOH in water, a fumed silica was added thereto. Subsequently, the mixture was agitated for 15 minutes to obtain an aluminosilicate gel having the following composition (raw material composition).

40.28 SiO$_2$:1.00 Al$_2$O$_3$:13.06 Na$_2$O:1133.32 H$_2$O

To the aluminosilicate gel, a β-zeolite (product name: HSZ920HOA, manufactured by Tosoh Corporation) was added by 10.0 wt % and mixed.

The resulting raw material composition was transferred to an autoclave and reacted at 140° C. for 19 hours to obtain a crystallized product. The crystallized product was solid-liquid separated, washed with pure water, then dried in an atmosphere at 110° C. and collected.

The crystallized product was a zeolite made of a single phase of β-zeolite.

The resulting zeolite was calcined in the same manner as in Comparative Example 1 to make a zeolite in the present Comparative Example. The zeolite in the present Comparative Example was a zeolite made of a single phase of β-zeolite having an FWHM of the XRD peak corresponding to Peak$_{(302)}$ of 0.28. The SiO$_2$/Al$_2$O$_3$ ratio was 10.0 and the average crystal particle size was 0.34 μm, both being comparative to the values of the zeolite before calcination, respectively. It was confirmed that the crystal particles of the β-zeolite in the present Comparative Example contain primary crystal particles composed of crystals in an approximately octahedron shape.

Figure 9:
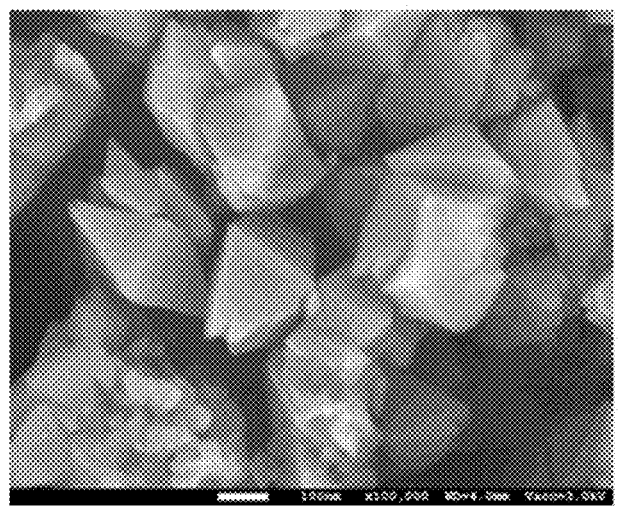
FIG. 9 shows an observation view of crystals of a β-zeolite in Comparative Example 3 (scale in drawing: 100 nm).

The crystals composing the crystal particles of the β-zeolite in the present Comparative Example were observed. The results are shown in FIG. 9. The crystal particle is composed of a crystal in an approximately octahedron shape oriented in the a-axis direction and the c-axis direction, with a double quadrangular frustum bottom to make the ridges and vertexes. The aspect ratio of the crystal was 1.5. It was therefore confirmed that the zeolite obtained by crystallizing a raw material composition containing no SDA is different in the shape of crystal and the orientation of crystal from the β-zeolite in the present embodiment.

Furthermore, the β-zeolite in the present Comparative Example has XRD peaks at 2θ=21.26°, 22.32° and 26.98°, while having no XRD peaks at 2θ=21.28° to 21.40°, 22.33° to 33.46°, and 27.00° to 27.12°. It was therefore confirmed that the β-zeolite in the present Comparative Example has an XRD pattern different from that of the β-zeolite in the present embodiment.

The IR spectrum of the β-zeolite had P1 and P2 at 3735 cm$^{-1}$ and 3595 cm$^{-1}$, respectively. Also, P2/P1 was 1.00.

Comparative Example 4

A β-zeolite having an SiO$_2$/Al$_2$O$_3$ ratio of less than 20 was produced according to a method described in Example 1 in Patent Literature 1.

In other words, a sodium aluminate solution (18.89 wt % Al$_2$O$_3$, 19.61 wt % Na$_2$O, 61.50 wt % H$_2$O), sodium hydroxide, TEAOH, pure water and fumed silica (AEROSIL 200) were sufficiently agitated in an autoclave reactor to obtain a raw material composition having the following composition.

23.1 SiO$_2$:1.00 Al$_2$O$_3$:1.94 Na$_2$O:1.62 (TEA)$_2$O:767 H$_2$O

To the resulting raw material composition, a β-zeolite was added by 7.55 wt % relative to the silica content in the composition and mixed.

The resulting raw material composition was reacted at 150° C. for 6 days to obtain a crystallized product. The crystallized product was subjected to solid-liquid separation, washed with deionized water, then dried in an atmosphere at 110° C. and collected.

The crystallized product was a zeolite made of a single phase of β-zeolite. The FWHM of the XRD peak corresponding to Peak$_{(302)}$ of the β-zeolite was 0.57. The main XRD peaks of the β-zeolite are shown in the following table.

TABLE 25

| 2 θ | Relative intensity* |
| --- | --- |
| 21.52° | 8 |
| 22.49° | 100 |
| 25.40° | 7 |

TABLE 25-continued

| 2 θ | Relative intensity* |
| --- | --- |
| 26.96° | 16 |
| 29.60° | 12 |

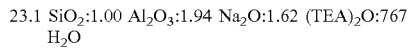
*Relative intensity is an intensity relative to peak intensity at 2θ = 22.49°.

The zeolite was calcined in the same manner as in Comparative Example 1 to obtain a zeolite in the present Comparative Example. The zeolite in the present Comparative Example was a zeolite made of a single phase of β-zeolite having an FWHM of the XRD peak corresponding to Peak$_{(302)}$ of 0.59 and an SiO$_2$/Al$_2$O$_3$ ratio of 18.2.

Figure 10:
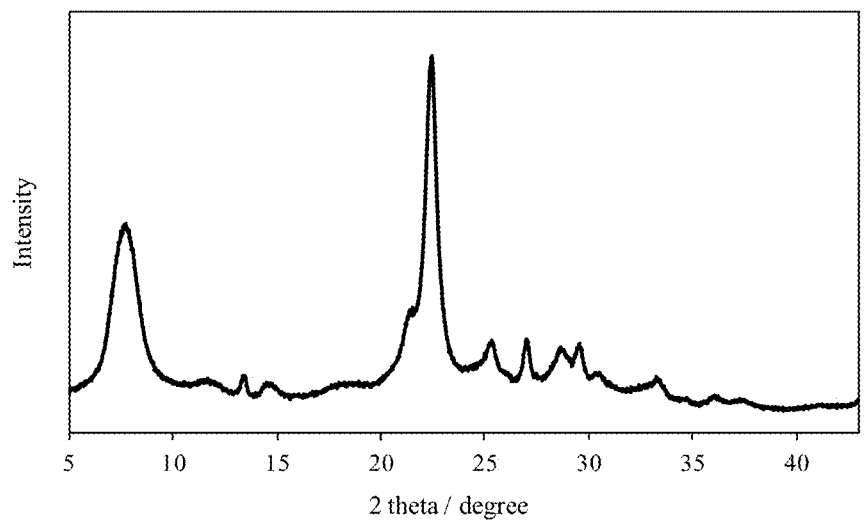
FIG. 10 shows an XRD pattern of β-zeolite in Comparative Example 4.
Figure 11:
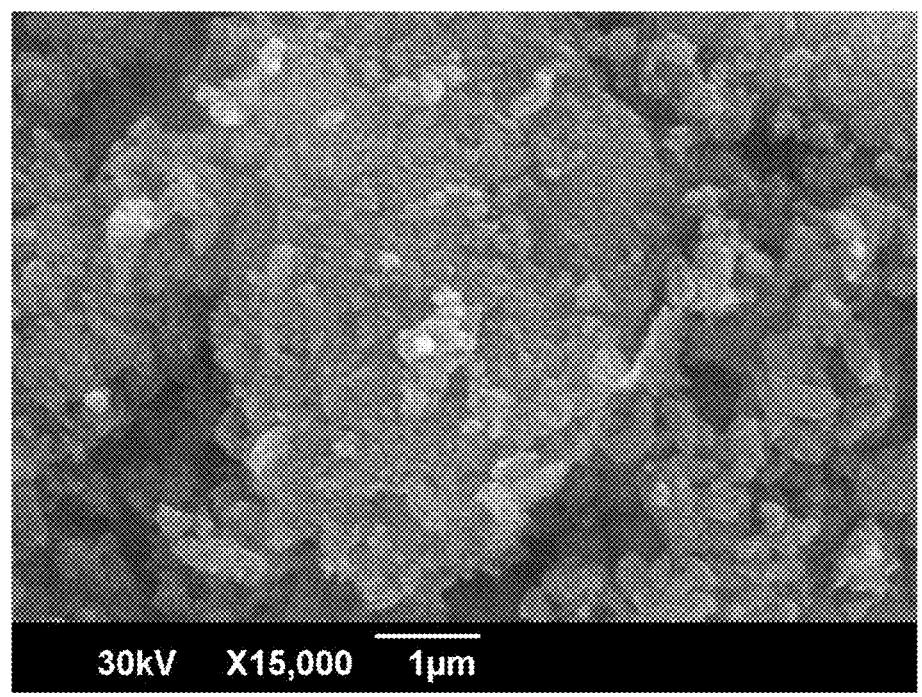
FIG. 11 shows an SEM observation view of β-zeolite in Comparative Example 4 (scale in drawing: 1 μm).

The main XRD peaks of the β-zeolite in the present Comparative Example are shown in the following table, the XRD pattern is shown in FIG. 10, and the SEM observation view is shown in FIG. 11.

TABLE 26

| 2 θ | Relative intensity* |
| --- | --- |
| 13.48° | 9 |
| 21.36° | 9 |
| 22.48° | 100 |
| 25.26° | 10 |
| 27.04° | 17 |
| 28.66° | 10 |
| 29.64° | 11 |

*Relative intensity is an intensity relative to peak intensity at 2θ = 22.48°.

The β-zeolite in the present Comparative Example, which was made by crystallizing a raw material composition having a K/SiO$_2$ ratio of 0.04, or further a raw material composition containing no potassium source, had an FWHM of the peak corresponding to Peak$_{(302)}$ larger than that of the β-zeolite in the present embodiment. It was therefore confirmed that the production method using a raw material composition containing no potassium source and the β-zeolite obtained thereby were different from those in the present embodiment. In addition thereto, the β-zeolite in the present Comparative Example had Peak$_{(302)}$ at a larger 2θ than the β-zeolite in the present Example.

In addition thereto, no primary crystal particle having a distinct shape was found in SEM observation with a magnification of 15000 times in FIG. 11, and therefore it was confirmed that no primary crystal particle having a size of more than 0.15 μm is present. While it was confirmed that a β-zeolite having a large average crystal particle size can be obtained by the production method in Examples even with an SiO$_2$/Al$_2$O$_3$ ratio of less than 20, it was confirmed that only a β-zeolite having a small average crystal particle size can be obtained from a raw material composition having a K/SiO$_2$ ratio of 0.04 or less, or containing no potassium source.

Measurement Example 1

(Evaluation of Heat Resistance)

Each of the zeolite samples obtained in Example 1, Example 2 and Comparative Example 1 was molded and ground to make aggregates having an aggregate size of 12 to 20 mesh. After filling 3 mL of the resulting aggregates in a normal pressure fixed bed flow type reaction tube, air containing 10 vol % of water was circulated therein under the following conditions to perform a hydrothermal aging treatment.

Air circulation rate: 300 mL/min
Treatment temperature: 700° C.
Treatment time: 20 hours The zeolite samples before and after the hydrothermal aging treatment were subjected to XRD measurement in the same manner as in the identification of the crystal phase, so that the FWHM of P$_{(302)}$ of the resulting XRD patterns was determined. The results are shown in the following table.

TABLE 27

|  | SiO$_2$/Al$_2$O$_3$ ratio | FWHM (°) | |
|---|---|---|---|
|  |  | Before hydrothermal aging treatment | After hydrothermal aging treatment (FWHM$_{aged}$) |
| Example 1 | 17.4 | 0.27 | 0.31 |
| Example 2 | 17.6 | 0.28 | 0.30 |
| Comparative Example 1 | 17.7 | 0.59 | 0.60 |

Although all the β-zeolites in Examples 1 and 2 and Comparative Example 1 are β-zeolites having a comparable SiO$_2$/Al$_2$O$_3$ ratio of less than 20, the FWHM of Peak$_{(302)}$ of the β-zeolites in Examples 1 and 2 before the hydrothermal aging treatment was 0.30 or less, i.e., smaller than that of the β-zeolite in Comparative Example 1. From the results, it was confirmed that the β-zeolite in the present Examples has high crystallinity in comparison with a conventional β-zeolite having an SiO$_2$/Al$_2$O$_3$ ratio of less than 20.

From the above table, it was also confirmed that FWHM of all the β-zeolites increases by the hydrothermal aging treatment. In addition thereto, FWHM$_{aged}$ was 0.60 in Comparative Example 1, while 0.35 or less in any of Examples. It was thereby confirmed that the β-zeolite in Examples can retain high crystallinity even after exposure to high temperature and high humidity, having a higher heat resistance than a conventional β-zeolite having an SiO$_2$/Al$_2$O$_3$ ratio of less than 20.

Measurement Example 2

(Containing Iron)

From the zeolite obtained in Example 1 and Comparative Examples 1 and 2, iron-containing β-zeolites were obtained. In other words, an aqueous solution of iron nitrate was prepared by dissolving 2.24 g of iron nitrate nonahydrate in 3.1 g of pure water. The aqueous solution of iron nitrate was dropped to 10.0 g of a calcined zeolite, and then mixed in a mortar for 10 minutes. After mixing, the β-zeolite was dried at 110° C. overnight, and then calcined in air at 500° C. for 1 hour to obtain an iron-containing β-zeolite.

(Hydrothermal Aging Treatment)

The iron-containing β-zeolite was molded and ground to make aggregates having an aggregate size of 12 to 20 mesh. After 3 mL of aggregates of iron-containing β-zeolite were filled in a normal pressure fixed bed flow type reaction tube, air containing 10 vol % water was circulated to perform a hydrothermal aging treatment under the following conditions.

Air circulation rate: 300 mL/min
Treatment temperature: 700° C.
Treatment time: 20 hours (Method for Measuring Nitrogen Oxide Reduction Ratio (%))

The samples before and after the hydrothermal aging treatment were molded and ground to make aggregates having an aggregate size of 12 to 20 mesh. After filling 1.5 mL of the sample in an aggregate form in a normal pressure fixed bed flow type reaction tube, a nitrogen oxide-containing gas held at the following measurement temperature was circulated to measure the concentration of nitrogen oxides at the inlet and outlet of the normal pressure fixed bed flow type reaction tube. The circulation conditions of the nitrogen oxide-containing gas were as follows.

Composition of nitrogen oxide-containing gas:
NO: 200 ppm
NH$_3$: 200 ppm
O$_2$: 10 vol %
H$_2$O: 3 vol %
N$_2$: balance
Nitrogen oxide-containing gas circulation rate: 1.5 L/min
Space velocity: 60000 hr$^{-1}$
Measurement temperature: 200° C.

From the nitrogen oxide concentration obtained, the nitrogen oxide reduction ratio was determined by the following equation.

Nitrogen oxide reduction ratio (%)={([NOx]in−[NOx]out)/[NOx]in}×100

[NOx]in is the nitrogen oxide concentration of the nitrogen oxide-containing gas at the inlet of the normal pressure fixed bed flow reactor, and [NOx]out is the nitrogen oxide concentration of the nitrogen oxide-containing gas at the outlet of the normal pressure fixed bed flow reactor.

Figure 12:
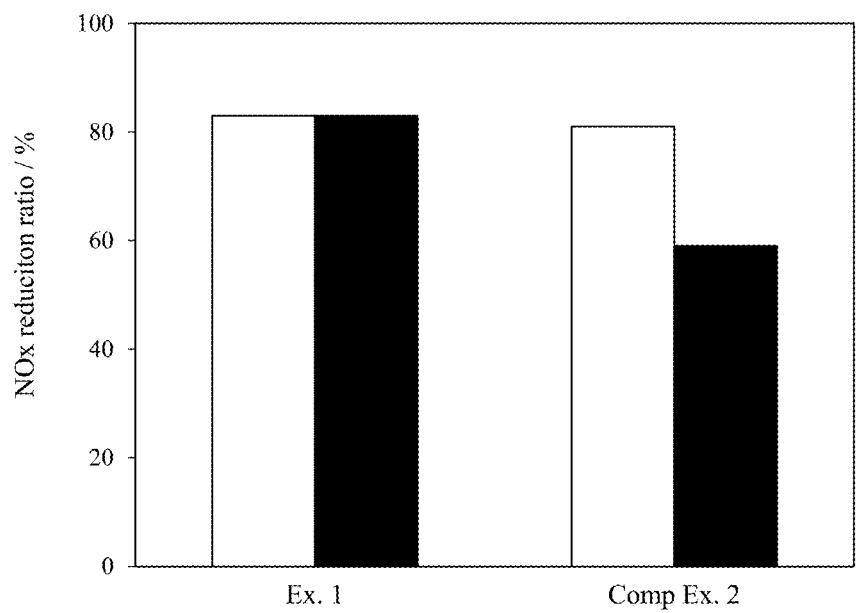
FIG. 12 is a graph showing the nitrogen oxide reduction ratio of an iron-containing β-zeolite (colorless bar: fresh sample, solid black bar: 20-h aging sample)

The nitrogen oxide reduction ratio of the iron-containing β-zeolite before hydrothermal aging treatment (hereinafter also referred to as "fresh sample"), and the nitrogen oxide reduction ratio of the iron-containing β-zeolite after hydrothermal aging treatment (hereinafter also referred to as "20-h aging sample") are shown in the following table and FIG. 12.

TABLE 28

|  |  |  | Nitrogen oxide reduction ratio (%) | |
|---|---|---|---|---|
|  | SiO$_2$/Al$_2$O$_3$ ratio | Iron content (wt %) | Fresh sample | 20-h Aging sample |
| Example 1 | 17.4 | 3.0 | 83 | 83 |
| Comparative Example 2 | 27.7 | 3.0 | 81 | 59 |

The iron-containing β-zeolite in Comparative Example 2 is an iron-containing β-zeolite having a relatively small decrease in nitrogen oxide reduction ratio with an SiO$_2$/Al$_2$O$_3$ ratio of 25 or more. In comparison with the iron-containing β-zeolite, the fresh sample of the iron-containing β-zeolite in the present Examples exhibited a comparative nitrogen oxide reduction ratio. In addition thereto, having an effect that decrease in the nitrogen oxide reduction ratio is smaller than that of the β-zeolite in Comparative Example 2 even after exposure to a high temperature water-containing atmosphere for a long time was confirmed. It was therefore confirmed that the β-zeolite in the present Examples has higher heat resistance and a smaller decrease in nitrogen oxide reduction ratio in a low temperature range in comparison with the β-zeolite having an SiO$_2$/Al$_2$O$_3$ ratio of 20 or more.

Next, the ratio of the nitrogen oxide reduction ratio of the 20-h aging sample to the nitrogen oxide reduction ratio of the fresh sample is shown in the following table.

TABLE 29

|  | SiO$_2$/Al$_2$O$_3$ ratio | Iron content (wt %) | Change ratio of nitrogen oxide reduction ratio (%) |
|---|---|---|---|
| Example 1 | 17.4 | 3.0 | 100% |
| Comparative Example 1 | 17.7 | 3.0 | 74% |

The iron-containing β-zeolites in Comparative Example 1 and Example 1 have an SiO$_2$/Al$_2$O$_3$ ratio of less than 20. Through a 20-hour hydrothermal aging treatment, while the nitrogen oxide reduction ratio of the iron-containing β-zeolite in Comparative Example 1 decreased by 25% or more, decrease in the nitrogen oxide reduction ratio of the iron-containing β-zeolite in Example 1 was undetectable in the range of measurement accuracy. It can be therefore confirmed that the β-zeolite in the present embodiment has higher heat resistance and smaller decrease in the nitrogen oxide reduction ratio in a low temperature range even after exposure to a high temperature and high humidity atmosphere, in comparison with a conventional β-zeolite having an SiO$_2$/Al$_2$O$_3$ ratio of less than 20.

It has been therefore confirmed that the iron-containing β-zeolite in the present Examples can be used as a catalyst having a long life when used as a catalyst for reducing nitrogen oxides, in addition to an effect having an excellent nitrogen oxide reduction characteristics.

INDUSTRIAL APPLICABILITY

The β-zeolite in the present disclosure can be used as a catalyst, particularly as a catalyst for reducing nitrogen oxides and a catalyst for reducing nitrogen oxides in a urea SCR. Furthermore, the β-zeolite in the present disclosure can be used as a catalyst base and an adsorbent base, and the production method thereof can be applied as an industrial method for producing a β-zeolite.

The entire content of the specification, claims, drawings and abstract of Japanese Patent Application No. 2017-239174 filed on Dec. 14, 2017 is incorporated herein by reference and incorporated as disclosure of the specification of the present invention.

The invention claimed is:

1. A β-zeolite, having a full width at half maximum of a powder X-ray diffraction peak of a (302) plane of 0.15 or more and 0.50 or less in powder X-ray diffraction measurement with a CuKα ray as radiation source, and a molar ratio of silica to alumina of less than 20.0.

2. The β-zeolite according to the claim 1, having a β-type structure content of 86% or more.

3. The β-zeolite according to claim 1, having a fluorine content of 100 ppm by weight or less.

4. The β-zeolite according to claim 1, having at least powder X-ray diffraction peaks below in powder X-ray diffraction measurement with a CuKα ray as radiation source:

| 2θ | Relative intensity* |
|---|---|
| 21.28°~21.40° | 10 or more and 20 or less |
| 22.33°~22.46° | 100 |
| 25.22°~25.36° | 10 or more and 20 or less |
| 27.00°~27.12° | 10 or more and 25 or less |
| 29.42°~29.66° | 10 or more and 25 or less | wherein relative intensity is an intensity relative to peak intensity at 2θ=22.33 to 22.46°.

5. The β-zeolite according to claim 1, containing at least one of iron and copper.

6. A method for producing a β-zeolite, comprising crystallizing a composition containing an alumina source, a silica source, an alkali source, a tetraethylammonium cation source and water, wherein the composition contains potassium, and a molar ratio of potassium to silica is more than 0.04 and
wherein the β-zeolite has a full width at half maximum of a powder X-ray diffraction peak of a (302) plane of 0.15 or more and 0.50 or less in powder X-ray diffraction measurement with a CuKα ray as radiation source, and a molar ratio of silica to alumina of less than 20.0.

7. The production method according to claim 6, wherein the alkali source is a potassium source.

8. The production method according to claim 6, wherein the composition has a molar composition below:
SiO$_2$/Al$_2$O$_3$ ratio=10.0 or more and 50.0 or less
TEA/SiO$_2$ ratio=0.03 or more and 0.30 or less
K/SiO$_2$ ratio=more than 0.04 and less than 0.70
Na/SiO$_2$ ratio=0 or more and less than 0.10
H$_2$O/SiO$_2$ ratio=5.0 or more and 50.0 or less
OH/SiO$_2$ ratio=0.10 or more and 1.00 or less
Seed crystal=0 wt % or more and 10 wt % or less.

9. A catalyst comprising the β-zeolite according to claim 1.

10. A method for reducing nitrogen oxides, comprising contacting the β-zeolite according to claim 1 with a nitrogen oxide-containing gas.

* * * * *